(12) United States Patent
Suzuka

(10) Patent No.: US 8,121,467 B2
(45) Date of Patent: *Feb. 21, 2012

(54) POSITION CONTROLLER FOR OPTICAL ELEMENT

(75) Inventor: Shinya Suzuka, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,737

(22) Filed: Dec. 6, 2010

(65) Prior Publication Data

US 2011/0141566 A1 Jun. 16, 2011

(30) Foreign Application Priority Data

Dec. 11, 2009 (JP) ................. 2009-281765

(51) Int. Cl.
  G03B 17/00 (2006.01)
  H04N 5/228 (2006.01)
  G02B 27/64 (2006.01)
(52) U.S. Cl. ............ 396/55; 348/208.11; 359/557
(58) Field of Classification Search ............ 396/55; 348/208.99, 208.7, 208.11; 359/223.1, 557
  See application file for complete search history.

(56) References Cited

U.S. PATENT DOCUMENTS

| | | | |
|---|---|---|---|
| 7,450,833 B2 * | 11/2008 | Nomura | 396/55 |
| 7,619,654 B2 * | 11/2009 | Ito et al. | 348/208.12 |
| 7,630,618 B2 | 12/2009 | Nomura | |
| 2006/0083503 A1 * | 4/2006 | Fukai | 396/55 |
| 2007/0183764 A1 * | 8/2007 | Imura et al. | 396/55 |
| 2009/0060485 A1 * | 3/2009 | Takahashi | 396/55 |

FOREIGN PATENT DOCUMENTS

| | | |
|---|---|---|
| JP | 2006-154674 | 6/2006 |
| JP | 2007-102050 | 4/2007 |

OTHER PUBLICATIONS

U.S. Appl. No. 12/960,725 to Shinya Suzuka, which was filed on Dec. 6, 2010.
U.S. Appl. No. 12/960,784 to Shinya Suzuka, which was filed on Dec. 6, 2010.

* cited by examiner

*Primary Examiner* — Clayton E Laballe
*Assistant Examiner* — Noam Reisner
(74) *Attorney, Agent, or Firm* — Greenblum & Bernstein P.L.C.

(57) ABSTRACT

A position controller for an optical element of an optical system includes a first movable member supported by a support member to be movable relative thereto in a first direction orthogonal to an optical axis, a second movable member which holds the optical element and is supported by the first movable member to be movable relative thereto in a second direction which is nonparallel to the first direction, an electromagnetic actuator that produces a driving force for moving at least the second movable member in the second direction, and an insertion/removal drive mechanism for moving the second movable member between an anti-shake driving position, at which a position control for the second movable member can be performed using the electromagnetic actuator, and a removed position at which the second movable member is positioned outside a range of the position control that uses the electromagnetic actuator.

14 Claims, 24 Drawing Sheets

POSITION CONTROLLER FOR OPTICAL ELEMENT

BACKGROUND OF THE INVENTION

1. Field of the Invention

The present invention relates to a position controller for an optical element.

2. Description of the Related Art

A type of image shake correcting mechanism (shake reduction mechanism/image stabilizing mechanism) which moves an optical element such as a lens element or an image sensor (image pickup device) in a plane orthogonal to an optical axis of an optical system (this optical element is hereinafter referred to as an image-shake-correcting optical element) to reduce image shake in an optical device such as a camera has been often used in recent years. The assignee of the present invention has proposed a structure for this type of image shake correcting mechanism wherein the moving range of the image-shake-correcting optical element is set to be greater than the effective moving range thereof for use in image shake correction (image shake reduction) to move the image-shake-correcting optical element to a position removed from an optical path, when an optical device that incorporates the image shake correcting mechanism moves from an operating state to a non-operating state. This structure is disclosed in Japanese Unexamined Patent Publication 2006-154674 (U.S. Pat. No. 7,630,618 B2).

Specifically, according to this proposed structure, there is provided a first movable frame movable in a specified direction in a plane orthogonal to an optical axis of an optical system, there is further provided a second movable frame which is supported by the first movable frame thereon to be movable in a direction different from the aforementioned specified direction in the plane orthogonal to the optical axis, and an image sensor (image pickup device) that serves as the image-shake-correcting optical element is fixed onto the second movable frame. The first movable frame and the second movable frame are moved to perform an image shake correcting operation, and the first movable frame is moved when the image sensor is moved to the aforementioned removed position.

According to this structure, the image-shake-correcting optical element (image sensor) which is removed (displaced) from an optical path and another optical element (e.g., a lens group or the like) which remains on the optical path can be positioned to lie in a plane orthogonal to the optical axis to thereby make it possible to achieve a reduction in length of the optical system in the optical axis direction when the optical device is in a non-operating state. In addition, as for the support structure for the image-shake-correcting optical element, a simplification of the structure can be achieved by making a single guide mechanism shared for two different purposes: for correcting image shake, and for removing (displacing) the image-shake-correcting optical element from an optical path.

SUMMARY OF THE INVENTION

The present invention provides a position controller for controlling the position of an optical element which can be driven to reduce image shake and removed from an optical path when the optical device that incorporates the image shake correcting mechanism is in an operating state and when the same optical device moves from an operating state to a non-operating state, respectively.

According to an aspect of the present invention, a position controller for an optical element of an optical system, including a first movable member supported by a support member to be movable relative to the support member in a first direction that is orthogonal to an optical axis of the optical system; a second movable member which holds the optical element and is supported by the first movable member to be movable relative to the first movable member in a second direction that is orthogonal to the optical axis and that is nonparallel to the first direction; an electromagnetic actuator including at least one magnet and at least one coil which are mounted to one and the other of the support member and the second movable member to produce a driving force for moving at least the second movable member in the second direction by passage of current through the coil within a magnetic field created by the magnet; and an insertion/removal drive mechanism for moving the second movable member in the second direction between an anti-shake driving position, at which a position control for the second movable member can be performed using the electromagnetic actuator, and a removed position at which the second movable member is positioned outside a range of the position control that uses the electromagnetic actuator.

It is desirable for the magnet and the coil, which are mounted to one and the other of the support member and the second movable member, to apply a driving force on the second movable member when the coil is energized, the driving force including both a directional component in the first direction and a directional component in the second direction.

It is desirable for the magnet and the coil, which are mounted to one and the other of the support member and the second movable member, to apply a driving force on the second movable member in the second direction when the coil is energized, and for the electromagnetic actuator to further include at least one second magnet and at least one second coil which are mounted to one and the other of the support member and the first movable member to apply a driving force on the first movable member in the first direction when the second coil is energized.

The first direction and the second direction can be straight directions substantially orthogonal to each other, wherein the support member includes a first linear guide shaft extending in the first direction, the first movable member being supported by the first linear guide shaft to be movable in an axial direction thereof, and the first movable member includes at least one second linear guide shaft extending in the second direction, the second movable member being supported by the second linear guide shaft to be movable in an axial direction thereof.

It is desirable for the support member to include an elongated hole that is elongated in the first direction, wherein the second guide shaft is slidably inserted in the elongated hole so as to be guided in the first direction.

It is desirable for the first movable member to be in the shape of a substantially rectangular frame including a pair of first-direction elongated portions extending in the first direction, a pair of second-direction elongated portions extending in the second direction, and an opening defined by the pair of first-direction elongated portions and the pair of second-direction elongated portions. At least one of the pair of first-direction elongated portions includes a guide hole into which the first linear guide shaft is slidably inserted. A pair of the second linear guide shafts extend alongside the pair of second direction elongated portions, respectively. The second movable member includes a pair of guide holes, into which the pair of second linear guide shafts are slidably inserted, respectively. The second movable member includes an optical element holding portion which is positioned between the pair of guide holes of the second movable member in the first direction, the optical element holding portion holding the optical element.

It is desirable for one of the pair of first direction elongated portions of the first movable member to include an offset recess that is recessed in the optical axis direction, wherein the optical element holding portion of the second movable member is positioned in the opening of the first movable member when the second movable member is positioned in the anti-shake driving position, and the optical element holding portion of the second movable member enters the offset recess when the second movable member moves from the anti-shake driving position to the removed position. Accordingly, the second movable member can be displaced to the removed position in a space-saving manner.

It is desirable for the position controller to include a second optical element that is movable in the optical axis direction relative to the support member, wherein the second optical element is positioned away from the optical element in the optical axis direction when the second movable member is positioned at the anti-shake driving position, and the second optical element enters into the opening when the second movable member moves from the anti-shake driving position to the removed position. Accordingly, a reduction in length of the optical system when the optical system is in a non-operating state (accommodated state) can be achieved.

It is desirable for the support member to be cylindrical in shape and to surround the first movable member. The support member includes a positioning recess which is formed on an inner peripheral surface of the support member to allow the second movable member to partly enter the positioning recess for positioning the first movable member and the second movable member in the first direction when the second movable member is positioned in the removed position.

It is desirable for the support member to be movable in the optical axis direction. The insertion/removal drive mechanism includes an insertion/removal operational member which is supported by the support member and movable between an insertion position to position the second movable member at the anti-shake driving position and a removed holding position to position the second movable member at the removed position, a biaser which biases the insertion/removal operational member toward the insertion position, and a removing-operation guide member which comes into contact with the insertion/removal operational member at a predetermined position of the support member in the optical axis direction and moves the insertion/removal operational member to the removed holding position against a biasing force of the biaser in accordance with a movement of the support member in the optical axis direction.

It is desirable for the insertion/removal operational member to include a swing member which is supported by the support member to be swingable about an axis of rotation that is substantially parallel to the optical axis.

It is desirable for the position controller to be incorporated in a photographing lens that is provided with a shake reduction system.

It is desirable for the photographing lens to be of a lens shutter type, wherein a shutter unit is fixed to the support member.

According to the optical element position controller according to the present invention, in the case where the optical element position controller is incorporated in a camera having a retractable lens, the positions of the first movable member and the second movable member can be controlled to perform an image shake correcting operation when the camera is in a ready-to-photograph state and only the second movable member that is supported by the first movable member thereon is moved to the displaced position by the insertion/removal drive mechanism when the retractable lens is accommodated, and accordingly, a mechanism which performs the insertion/removal operation is small and lightweight, so that a space-saving effect is attained and a reduction of load on the insertion/removal drive mechanism is achieved.

The present disclosure relates to subject matter contained in Japanese Patent Application No. 2009-281765 (filed on Dec. 11, 2009) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
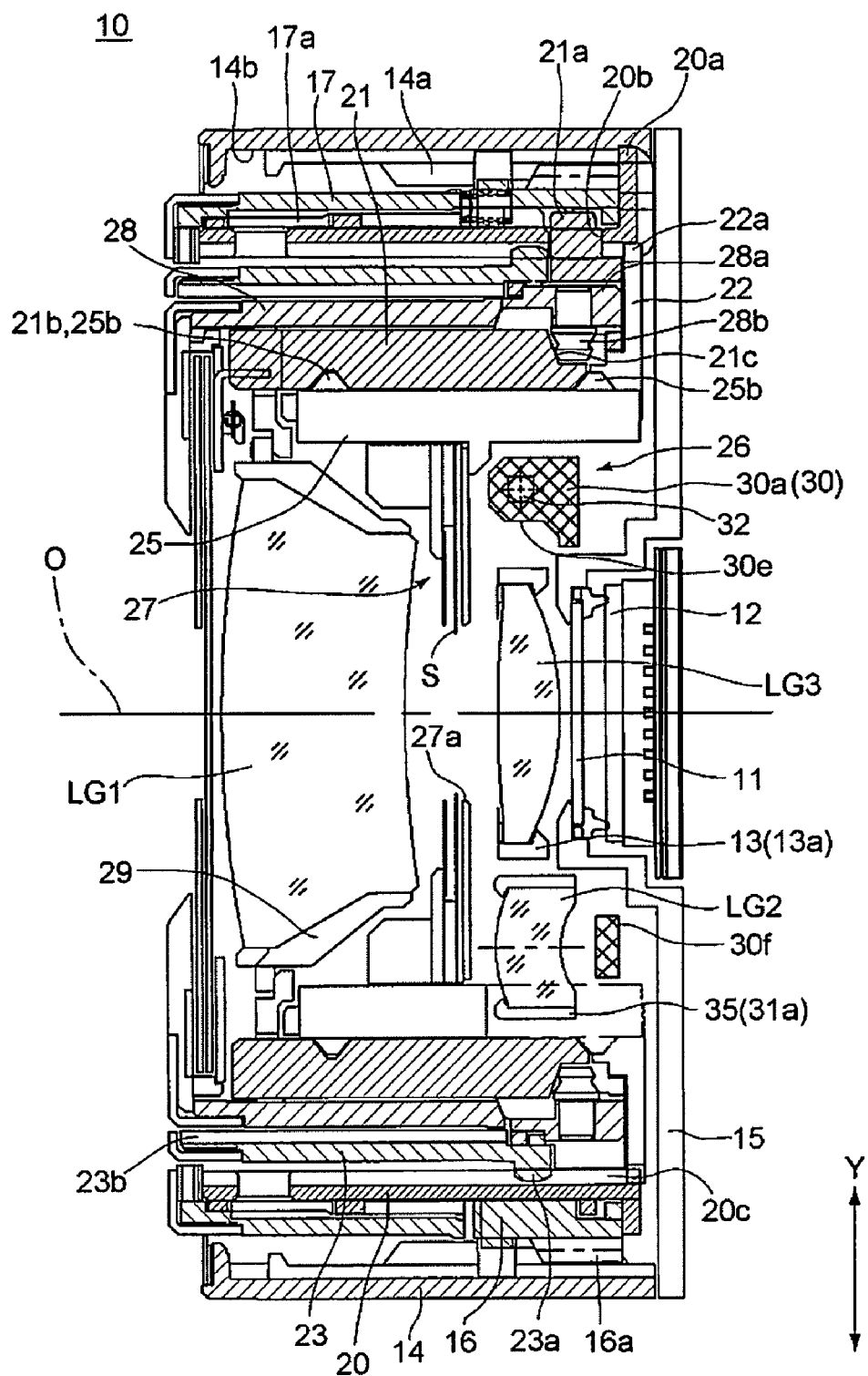
FIG. 1 is a cross sectional view of an embodiment of a zoom lens barrel of an imaging device, according to the present invention, in an accommodated state (fully-retracted state)
Figure 2:
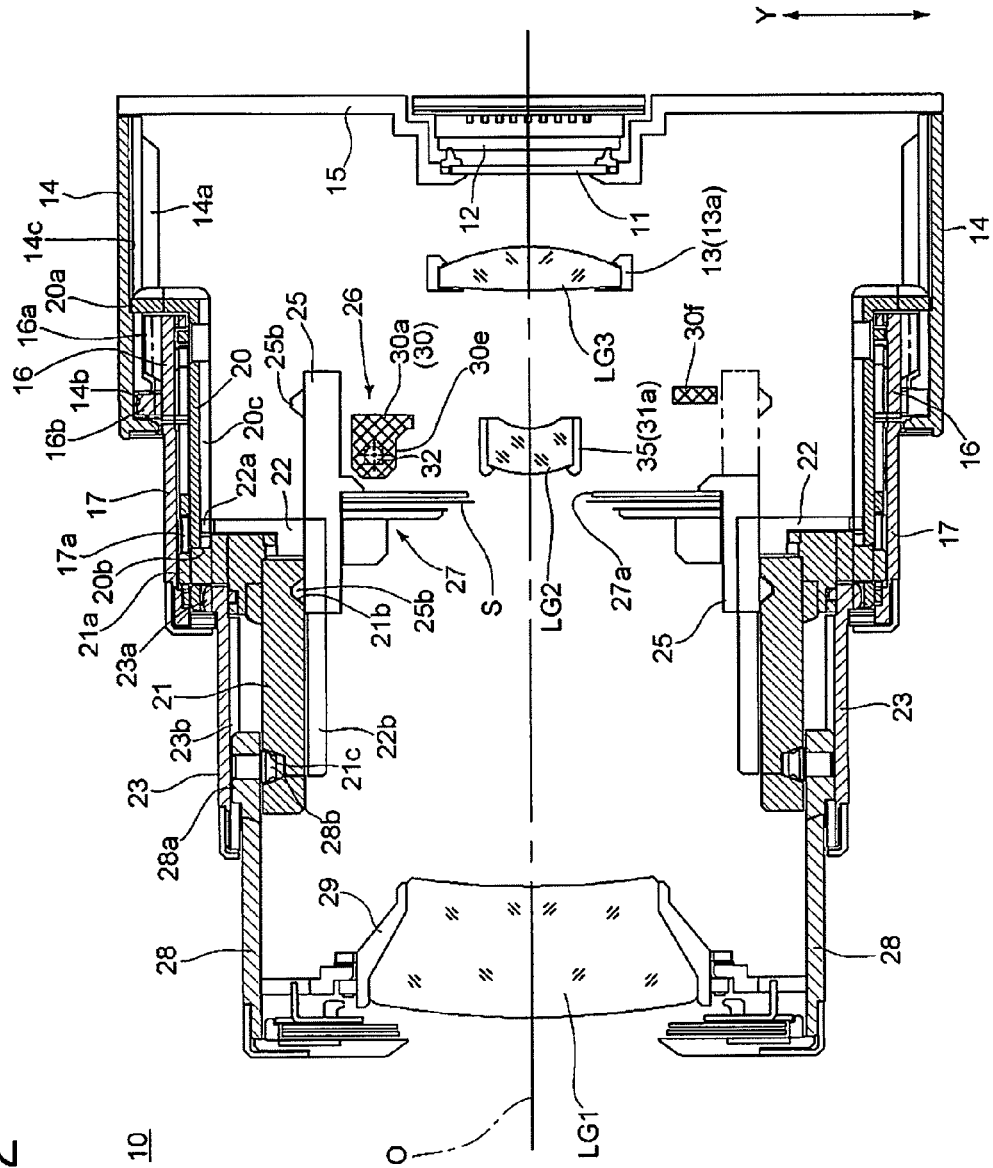
FIG. 2 is a cross sectional view of the zoom lens barrel set at the wide-angle extremity in the zoom range.
Figure 3:
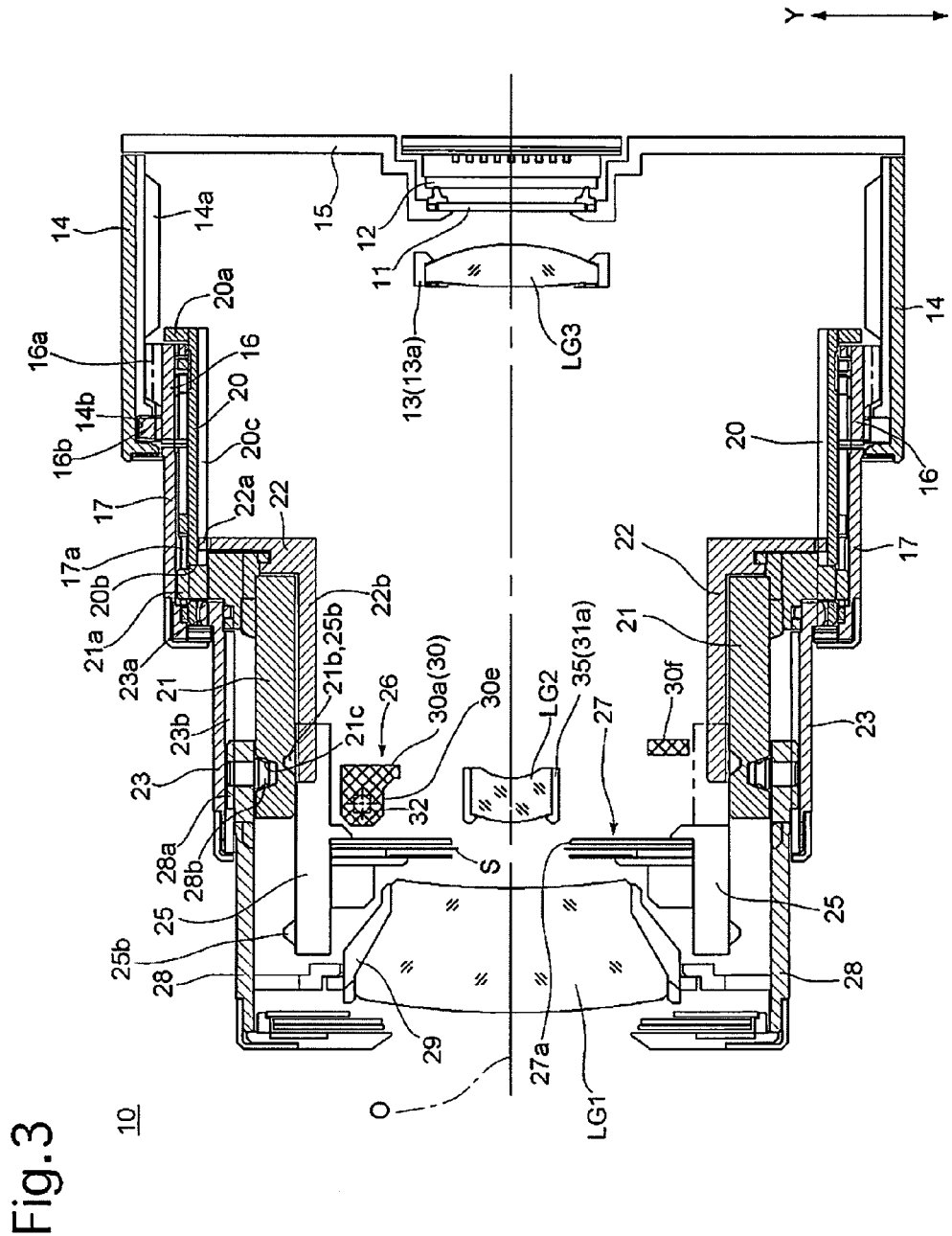
FIG. 3 is a cross sectional view of the zoom lens barrel set at the telephoto extremity in the zoom range.

A retractable zoom lens barrel (zoom lens) 10, a cross sectional view of which is shown in FIGS. 1 through 3, is provided with an imaging optical system which includes a first lens group LG1, a shutter S, a second lens group (optical element/removable optical element) LG2, a third lens group (second optical element) LG3, a low-pass filter 11 and an image sensor (image pickup device) 12, in that order from the object side. This imaging optical system is configured as a zoom optical system that provides a variable focal length. A zooming operation is carried out by moving the first lens group LG1 and the second lens group LG2 along an optical axis O of the imaging optical system in a predetermined moving manner. A focusing operation is carried out by moving the third lens group LG3 along the optical axis O. In the following descriptions, the optical axis direction refers to a direction along or parallel to the optical axis O, and the front and the rear refer to the front (object side) and the rear (image plane side) with respect to the optical axis direction, respectively.

The zoom lens barrel 10 is provided with a cylindrical housing 14 that constitutes a stationary member. An image sensor holder 15 is fixed to the back of the housing 14. The lower-pass filter 11 and the image sensor 12 are supported by the image sensor holder 15.

Figure 15:
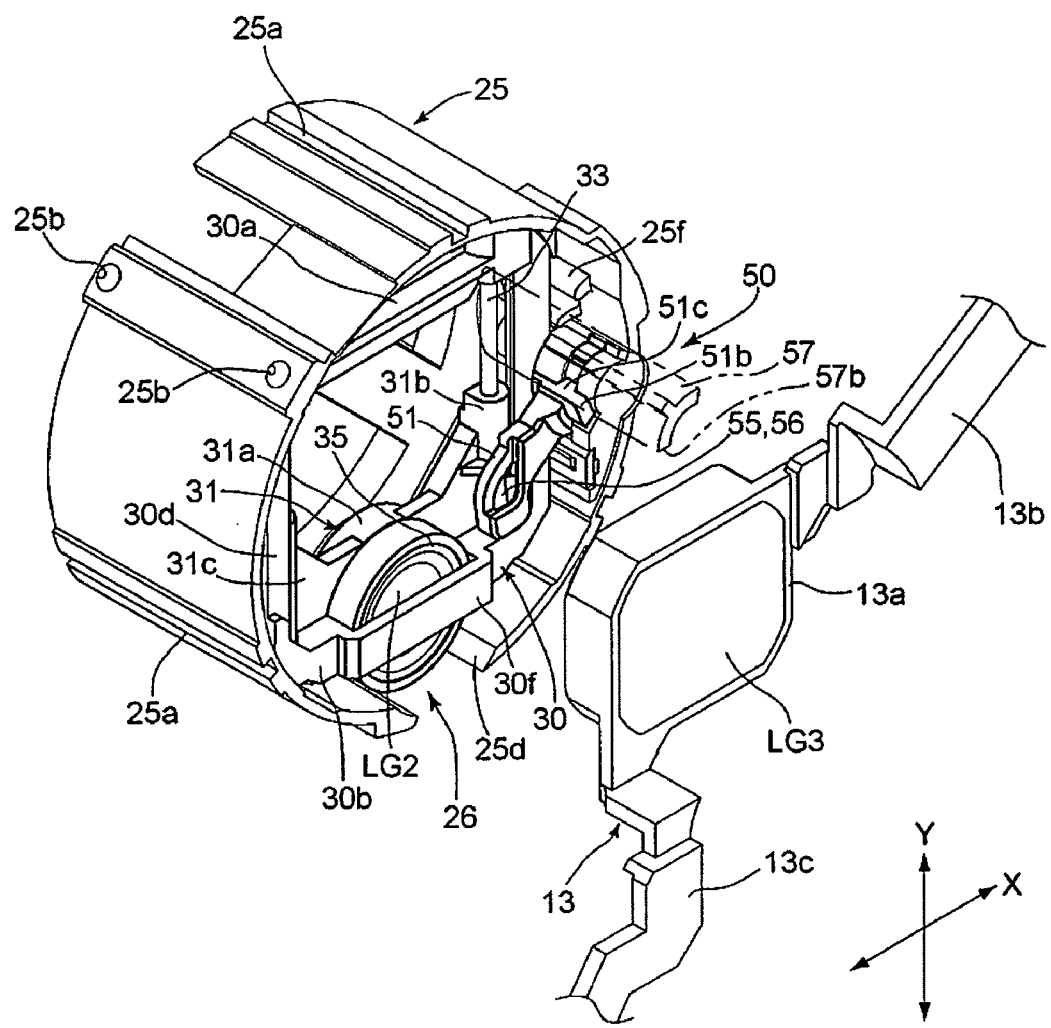
FIG. 15 is a rear perspective view of the second-lens-group support structure and a part of a third lens group frame that supports a third lens group, showing the state shown in FIG. 14 at a different angle.
Figure 16:
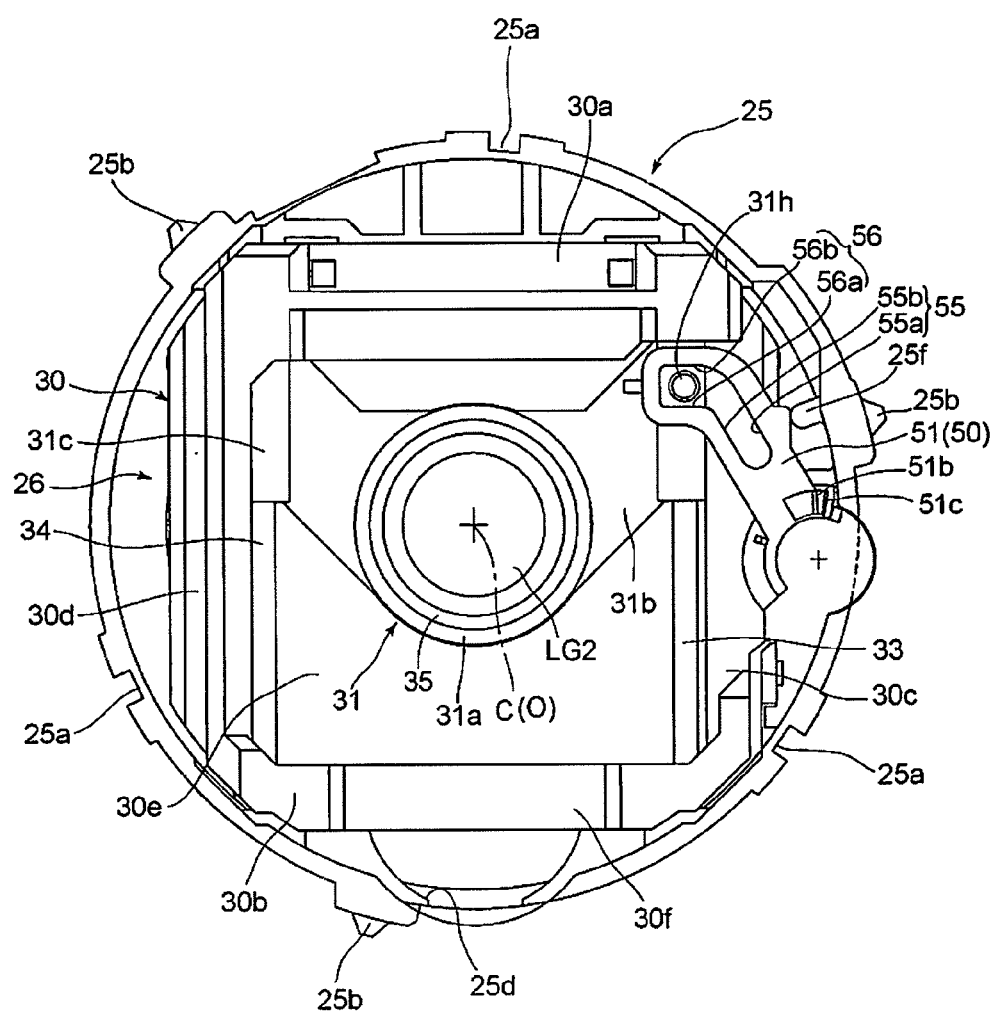
FIG. 16 is a rear elevational view of an insertion/removal drive mechanism and the anti-shake unit in a state where the second lens group is positioned in the anti-shake driving position, viewed from the rear in the optical axis direction.
Figure 17:
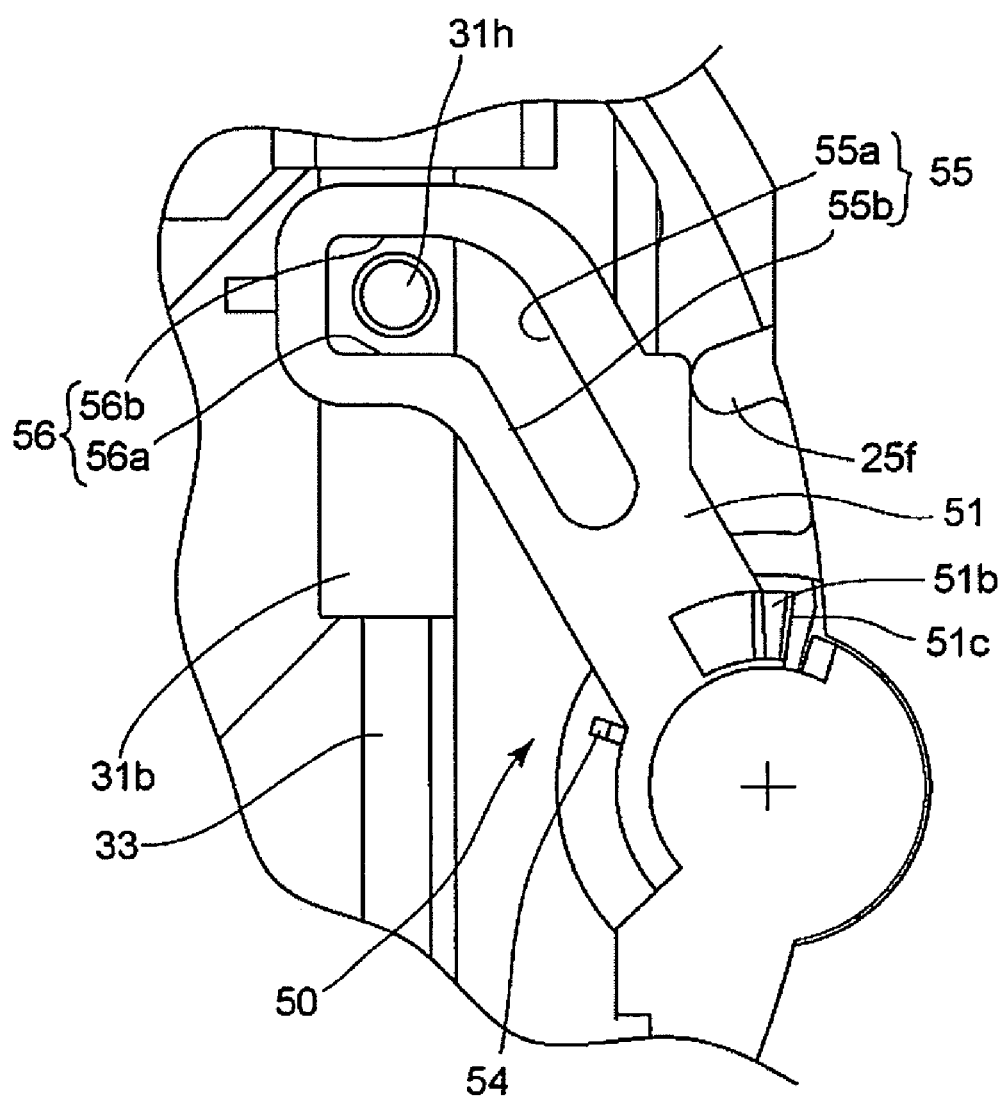
FIG. 17 is an enlarged view of a portion of the insertion/removal drive mechanism shown in FIG. 16.
Figure 20:
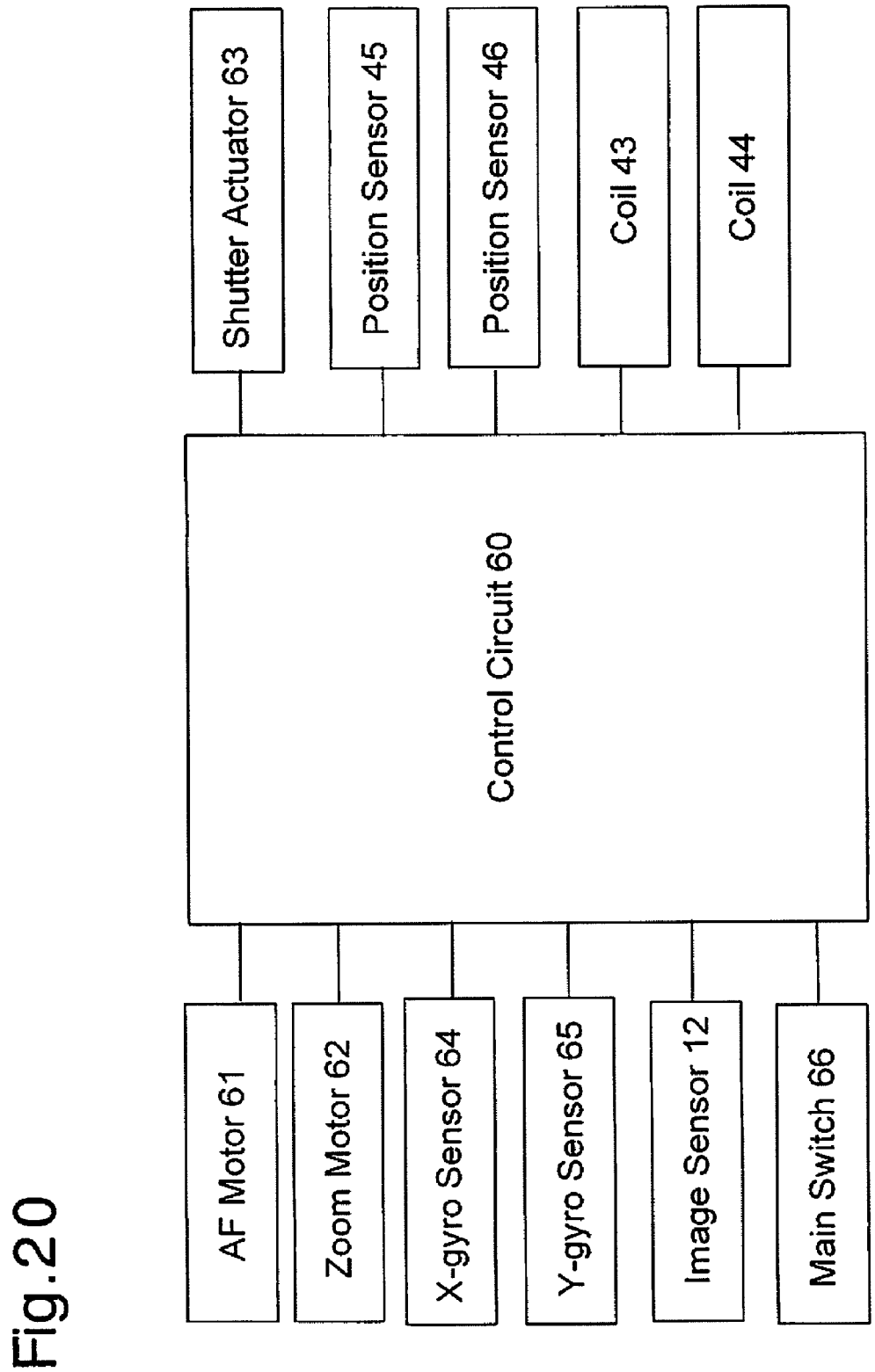
FIG. 20 is a schematic block diagram of a circuit configuration of the zoom lens barrel.

As shown in FIG. 15, the third lens group LG3 is supported by a lens holding frame (rectangular frame) 13a of a third lens group frame 13. The third lens group LG3 is in the shape of a substantially rectangle which is elongated horizontally, and the lens holding frame 13a is formed into a substantially rectangular frame to correspond to the shape of the third lens group LG3. The third lens group frame 13 is provided with a pair of guide arms 13b and 13c (partly shown in FIGS. 9 and 15) which project radially outwards from the lens holding frame 13a. Each of the pair of guide arms 13b and 13c is provided at a radially outer end thereof with a guide hole (not shown), and a pair of guide shafts (not shown) are slidably fitted into the two guide holes of the pair of guide arms 13b and 13c, respectively. The third lens group frame 13 is supported by the pair of guide shafts to be movable relative to the housing 14 in the optical axis direction with the pair of guide shafts slidably fitted into the two guide holes of the pair of guide arms 13b and 13c. The third lens group frame 13 is driven to move in the optical axis direction by an AF motor 61 (see FIG. 20) which is driven and controlled its operation by a control circuit 60 (see FIG. 20).

The zoom lens barrel 10 is provided inside the housing 14 with a helicoid ring 16 which is supported by the housing 14 to be rotatable about the optical axis O relative to the housing 14. The helicoid ring 16 is provided on an outer peripheral surface thereof with a circumferential gear 16a which is in mesh with a zoom gear (not shown). This zoom gear is driven to rotate by a zoom motor 62 (see FIG. 20), the operation of which is controlled by the control circuit 60 so that rotational force is transmitted to the helicoid ring 16 via the zoom gear. When the zoom lens barrel 10 is in a state between the accommodated state (fully-retracted state) shown in FIG. 1 and a state immediately before the zoom lens barrel 10 is set at the wide-angle extremity shown in FIG. 2, the housing 14 and the helicoid ring 16 are coupled to each other via male helicoid threads formed on the outer periphery of the helicoid ring 16 and female helicoidal threads 14a formed on an inner peripheral surface of the housing 14, and driving the zoom motor 62 causes the helicoid ring 16 to move in the optical axis direction while rotating and being guided by the female helicoidal threads 14a. The circumferential gear 16a is formed on the male helicoid threads of the helicoid ring 16. On the other hand, when the zoom lens barrel 10 is in a ready-to-photograph state between the wide-angle extremity and the telephoto extremity, the aforementioned helicoid coupling is released, and thereupon rotational guide projections 16b (see FIGS. 2 and 3) formed on an outer peripheral surface of the helicoid ring 16 are engaged in a circumferential groove 14b formed on an inner peripheral surface of the housing 14 so that the helicoid ring 16 rotates at an axial fixed position, i.e., without moving in the optical axis direction, in accordance with the operation of the zoom motor 62. A first advancing barrel 17 which rotates about the optical axis O and moves in the optical axis direction with the helicoid ring 16 is coupled to the front of the helicoid ring 16.

The zoom lens barrel 10 is provided inside the first advancing barrel 17 and the helicoid ring 16 with a first linear guide ring 20. The first linear guide ring 20 is guided linearly in the optical axis direction by engagement of linear guide grooves 14c (see FIG. 2) formed on an inner peripheral surface of the housing 14 with linear guide projections 20a which project radially outwards from the rear end of the first linear guide ring 20. The first linear guide ring 20 is engaged with the first advancing barrel 17 and the helicoid ring 16 to move with the first advancing barrel 17 and the helicoid ring 16 in the optical axis direction and to be allowed to rotate relative to the first advancing barrel 17 and the helicoid ring 16.

The first linear guide ring 20 is provided with a plurality of guide slots (through-grooves) 20b which are formed through inner and outer peripheral surfaces of the first linear guide ring 20, i.e., the guide slots 20b are formed completely through the first linear guide ring 20. The zoom lens barrel 10 is provided radially inside the first linear guide ring 20 with a cam ring 21. The cam ring 21 is provided at different circumferential positions thereon with a plurality of radially outer projections 21a which project radially outwards. Each guide slot 20b is provided with a lead groove portion inclined relative to the optical axis O and a circumferential groove portion about the optical axis O, and the plurality of radially outer projections 21a of the cam ring 21 are slidably engaged in the plurality of guide slots 20b, respectively. The plurality of radially outer projections 21a are further engaged in a corresponding plurality of rotation transfer grooves 17a which are formed on an inner peripheral surface of the first advancing barrel 17 to extend parallel to the optical axis O, so that the cam ring 21 rotates with the first advancing barrel 17. The cam ring 21 advances and retracts in the optical axis direction while rotating and being guided by the lead groove portions of the plurality of guide slots 20b when each radially outer projection 21a engages in the lead groove portion of the associated guide slot 20b, and rotates at an axial fixed position, i.e., without moving in the optical axis direction, relative to the first advancing barrel 17 (the helicoid ring 16) and the first linear guide ring 20 when each radially outer projection 21a engages in the circumferential groove portion of the associated guide slot 20b. Similar to the helicoid ring 16 and the first advancing barrel 17, the cam ring 21 moves forward and rearward in the optical axis direction while rotating when the zoom lens barrel 10 is in a state between the accommodated state and the ready-to-photograph state at the wide-angle extremity, and rotates at an axial fixed position when the zoom lens barrel 10 is in the ready-to-photograph state between the wide-angle extremity and the telephoto extremity.

The first linear guide ring 20 is provided on an inner peripheral surface thereof with a plurality of linear grooves 20c which extend parallel to the optical axis O. The zoom lens barrel 10 is provided radially inside the first advancing barrel 20 with a second linear guide ring 22. The second linear guide ring 22 is provided with a plurality of linear guide projections 22a which project radially outwards to be engaged in the plurality of linear grooves 20c of the first linear guide ring 20 to be freely slidable therein, respectively. The zoom lens barrel 10 is provided immediately inside the first advancing barrel 17 with a second advancing barrel 23 which advances and retracts relative to the first advancing barrel 17. The second advancing barrel 23 is provided with a plurality of linear guide projections 23a which project radially outwards to be engaged in the plurality of linear grooves 20c of the first linear guide ring 20, respectively. Due to the engagement of each linear guide projection 22a with the associated linear groove 20c and the engagement of each linear guide projection 23a with the associated linear groove 20c, each of the second linear guide ring 22 and the second advancing barrel 23 is guided linearly in the optical axis direction. Although the linear guide projections 22a and the associated linear guide projections 23a are illustrated as being engaged in a common linear guide groove 20c in the drawings, such linear guide projections 22a and 23a can be respectively engaged in different linear grooves formed on the inner peripheral surface of the first linear guide ring 20 in an alternative arrangement. The cam ring 21 is supported to be rotatable relative to each of the second linear guide ring 22 and the second advancing barrel 23 and to move with each of the second linear guide ring 22 and the second advancing barrel 23 in the optical axis direction.

The second linear guide ring 22 is provided at different circumferential positions thereof with a set of three linear guide keys 22b which extend forward in the optical axis direction. The zoom lens barrel 10 is provided immediately inside the cam ring 21 with a second lens group moving ring (support member) 25 which is guided linearly in the optical axis direction. The second linear guide ring 22 guides the second lens group moving ring 25 linearly in the optical axis direction with the set of three linear guide keys 22b being slidably engaged in a set of three linear grooves 25a (see FIGS. 4, 7 through 18) which are formed on an outer peripheral surface of the second lens group moving ring 25. The second lens group moving ring 25 supports the second lens group LG2 via an anti-shake unit 26. The anti-shake unit 26 is positioned inside the second lens group moving ring 25 and supports the second lens group LG2 in a manner to allow the second lens group LG2 to move along a plane substantially orthogonal to the optical axis O. The detailed structure of the anti-shake unit 26 will be discussed later. The zoom lens barrel 10 is further provided inside the second lens group moving ring 25 with a shutter unit 27 including the shutter S (including of a plurality of shutter blades). The shutter unit 27 is fixed to the front of the anti-shake unit 26. The shutter unit 27 is provided therein with a shutter actuator 63 (see FIG. 20) which actuates the shutter S to open and shut the plurality of shutter blades. A shutter opening (adjustable aperture) 27a is formed by the shutter S at a center of the shutter unit 27.

The zoom lens barrel 10 is provided immediately inside the second advancing barrel 23 with a third advancing barrel 28 which advances and retracts relative to the second advancing barrel 23. The second advancing barrel 23 is provided on an inner peripheral surface thereof with a plurality of linear guide grooves 23b which are parallel to the optical axis O, and the third advancing barrel 28 is provided with a corresponding plurality of linear guide projections 28a which project radially outwards to be engaged in the plurality of linear guide grooves 23b of the second advancing barrel 23 to be freely slidable therein, respectively. Due to the engagement of the linear guide projections 28a with the linear guide grooves 23b, the third advancing barrel 28 is also guided linearly in the optical axis direction. The third advancing barrel 28 supports the first lens group LG1 therein via a first lens group frame 29.

The cam ring 21 is provided on an inner peripheral surface thereof with a plurality of second-lens-group control cam grooves 21b for guiding the second lens group LG2, and the second lens group moving ring 25 is provided on an outer peripheral surface thereof with a corresponding plurality of cam followers 25b for moving the second lens group LG2 which are engaged in the plurality of second-lens-group control cam grooves 21b of the cam ring 21, respectively. The second lens group moving ring 25 is guided linearly in the optical axis direction via the second linear guide ring 22, and accordingly, a rotation of the cam ring 21 causes the second lens group moving ring 25, i.e., the second lens group LG2, to move in the optical axis direction in a predetermined moving manner in accordance with the contours of the second-lens-group control cam grooves 21b.

A plurality of cam followers 28b for guiding the first lens group LG1 are provided on the third advancing barrel 28 and project radially inwards to be slidably engaged in a corresponding plurality of first-lens-group control cam grooves 21c formed on an outer peripheral surface of the cam ring 21, respectively. The third advancing barrel 28 is guided linearly in the optical axis direction via the second advancing barrel 23, and accordingly, a rotation of the cam ring 21 causes the third advancing barrel 28, i.e., the first lens group LG1, to move in the optical axis direction in a predetermined moving manner in accordance with the contours of the first-lens-group control cam grooves 21c.

The zoom lens barrel 10 is provided with an image shake correcting apparatus (shake reduction system) for reducing image shake of an image formed on the light receiving surface of the image sensor 12. Although the details of the image shake correcting apparatus will be discussed later, the image shake correcting apparatus detects vibrations to the zoom lens barrel 10 by an X-gyro sensor 64 and a Y-gyro sensor 65 (see FIG. 20) and controls the operation of the anti-shake unit 26 to move the second lens group LG2 in directions orthogonal to the optical axis O in accordance with detection information obtained from the X-gyro sensor 64 and the Y-gyro sensor 65.

Figure 6:
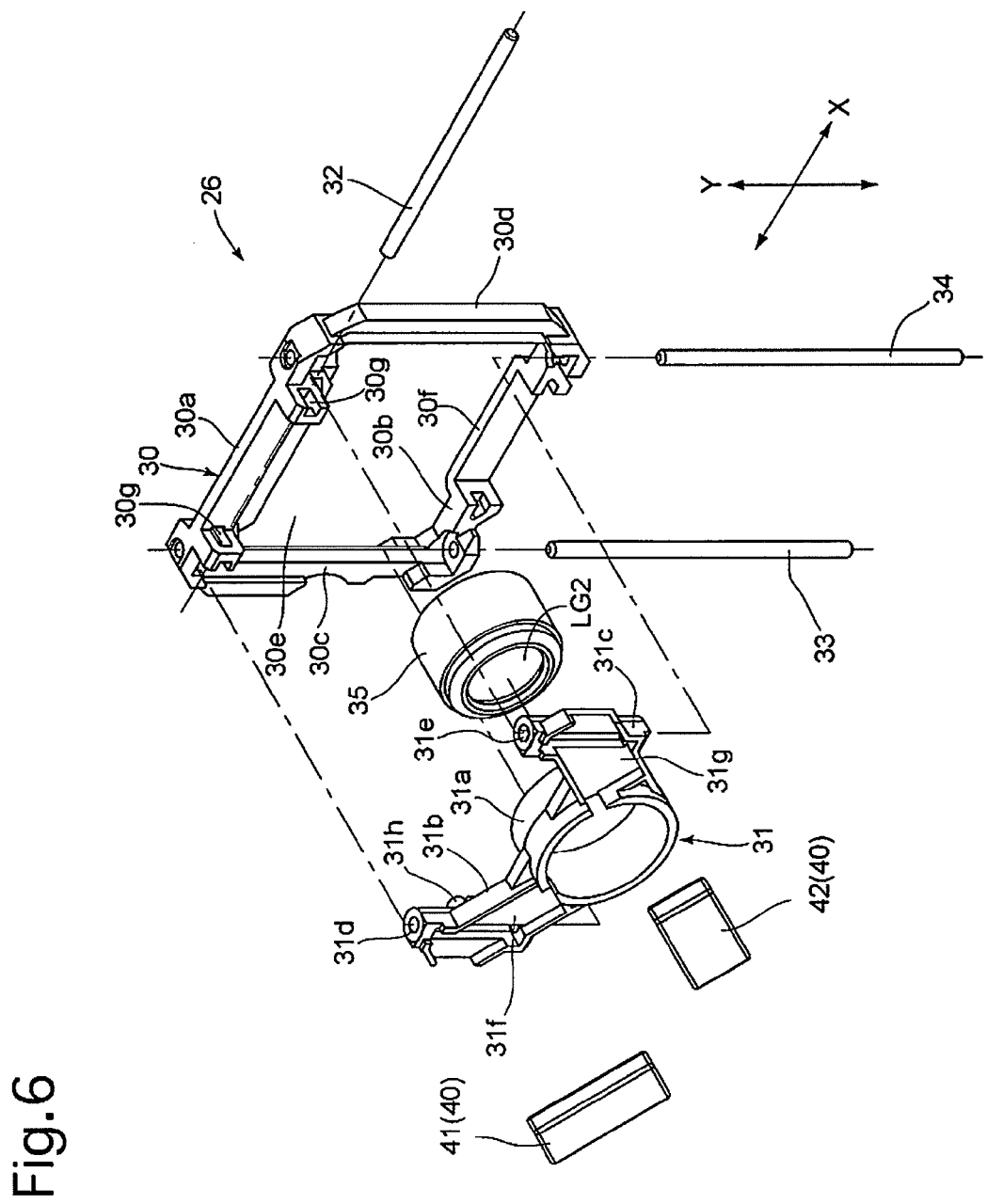
FIG. 6 is an exploded perspective view of the anti-shake unit.

As shown in FIG. 6, the anti-shake unit 26 is provided with a first movable stage (first movable member) 30 and a second movable stage (second movable member) 31. The first movable stage 30 is supported by an X-guide shaft (first linear guide shaft) 32 to be slidable thereon. The X-guide shaft 32 is fixed to the second lens group moving ring 25 therein. The second movable stage 31 is supported by a pair of Y-guide shafts (second linear guide shafts) 33 and 34 to be slidable thereon. The pair of Y-guide shafts 33 and 34 are fixed to the first movable stage 30. The axis of the X-guide shaft 32 extends in the lateral direction in a plane orthogonal to the optical axis O, and the moving direction of the first movable stage 30, in which the X-guide shaft 32 is elongated, will be hereinafter referred to as the X-direction. The pair of Y-guide shafts 33 and 34 are positioned parallel to each other so that the axes thereof extend in a plane orthogonal to the optical axis O and in the vertical direction that is orthogonal to the X-guide shaft 32, and the moving direction of the second movable stage 31, in which the pair of Y-guide shafts 33 and 34 are elongated, will be hereinafter referred to as the Y-direction.

The first movable stage 30 is provided with an upper side portion (first-direction elongated portion) 30a and a lower side portion (first-direction elongated portion) 30b which are spaced from each other in the Y-direction and elongated in the X-direction, and is further provided with two lateral side portions (second-direction elongated portions) 30c and 30d which are spaced from each other in the X-direction and elongated in the Y-direction. The first movable stage 30 is in the shape of a substantially rectangular frame having an opening 30e at a center thereof that is surrounded by the upper side portion 30a, the lower side portion 30b and the two lateral side portions 30c and 30d. The opening 30e has a size and a shape that allows the lens holding frame 13a of the third lens group frame 13 to enter therein. As can be seen from FIGS. 9 and 10, when the lens holding frame 13a is made to enter the opening 30e at a position adjacent to the upper side portion 30a, an empty space is secured between the lens holding frame 13a and the lower side portion 30b. The lower side portion 30b is provided on the front thereof with an offset recess 30f which is bent and recessed rearward in the optical axis direction. The upper side portion 30a is provided thereon, at two different positions in the X-direction, with two X-guide holes 30g, respectively, as shown in FIG. 6. The X-guide shaft 32 is slidably inserted through the two X-guide holes 30g. The Y-guide shaft 33 is fixed to the first movable stage 30 in the opening 30e at a position alongside the lateral side portion 30c and the Y-guide shaft 34 is fixed to the first movable stage 30 in the opening 30e at a position alongside the lateral side portion 30d. The lower ends of the Y-guide shaft 33 and 34 project downward from the lower side portion 30b to be inserted into a pair of elongated holes 25c (see FIG. 4) formed on an inner surface of the second lens group moving ring 25. The pair of elongated holes 25c are elongated in the X-direction to guide the pair of guide shafts 33 and 34 in the X-direction. On the other hand, each Y-guide shaft 33 and 34 is prevented from moving in the optical axis direction by the front and rear walls in the associated elongated hole 25c. With the above described structure, the first movable stage 30 is supported by the second lens group moving ring 25 to be movable in the X-direction relative to the second lens group moving ring 25.

The second movable stage 31 is provided with a cylindrical lens holder portion (optical element holding portion) 31a and a pair of support arms 31b and 31c. A second lens group frame 35 which holds the second lens group LG2 is fixed to the cylindrical lens holder portion 31a. The pair of support arms 31b and 31c extend obliquely upwards into a V-shape so as to be substantially symmetrical with respect to a straight line that extends vertically in the Y-axis direction and passes through the optical axis O. The pair of Y-guide shafts 33 and 34 are slidably inserted into two Y-guide holes 31d and 31e which are formed through the pair of support arms 31b and 31c, respectively. According to this structure, the second movable stage 31 is supported by the first movable stage 30 to be movable in the Y-direction relative to the first movable stage 30. Due to this movement of the second movable stage 31 in the Y-direction, the second movable stage 31 varies the position thereof in the opening 30e of the first movable stage 30.

The anti-shake unit 26 is provided with an electromagnetic actuator 40 for driving the first movable stage 30 and the second movable stage 31 and for controlling the operations thereof. The electromagnetic actuator 40 is provided with two permanent magnets 41 and 42 which are fixedly mounted on the second movable stage 31, and is further provided with two coils 43 and 44 which are fixed to the shutter unit 27. The permanent magnets 41 and 42 are substantially identical in shape and size to each other. Each of the permanent magnets 41 and 42 is in the shape of a narrow, thin rectangular plate. Opposite sides of a magnetic pole boundary line M1 (see FIGS. 7 through 10) of the permanent magnet 41 which extends in the lengthwise direction thereof and passes through an approximate center of the permanent magnet 41 in the widthwise direction are magnetized into north and south poles, respectively, while opposite sides of a magnetic pole boundary line M2 (see FIGS. 7 through 10) of the permanent magnet 42 which extends in the lengthwise direction thereof and passes through an approximate center of the permanent magnet 42 in the widthwise direction are magnetized into north and south poles, respectively. In other words, each of the magnetic pole boundary lines M1 and M2 define a boundary between north and south poles of each of the permanent magnets 41 and 42, respectively. The support arm 31b of the second movable stage 31 is provided on a front surface thereof with a magnet holding portion 31f, into which the permanent magnet 41 is fitted to be supported thereby and the support arm 31c of the second movable stage 31 is provided on a front surface thereof with a magnet holding portion 31g, into which the permanent magnet 42 is fitted to be supported thereby. The support arm 31b that includes the magnet holding portion 31f is formed as an arm which extends substantially parallel to the magnetic pole boundary line M1 from the cylindrical lens holder portion 31a to an end of the support arm 31b in which the Y-guide hole 31d is formed, and the support arm 31c that includes the magnet holding portion 31g is formed as an arm which extends substantially parallel to the magnetic pole boundary line M2 from the cylindrical lens holder portion 31a to an end of the support arm 31c in which the Y-guide hole 31e is formed.

Figure 7:
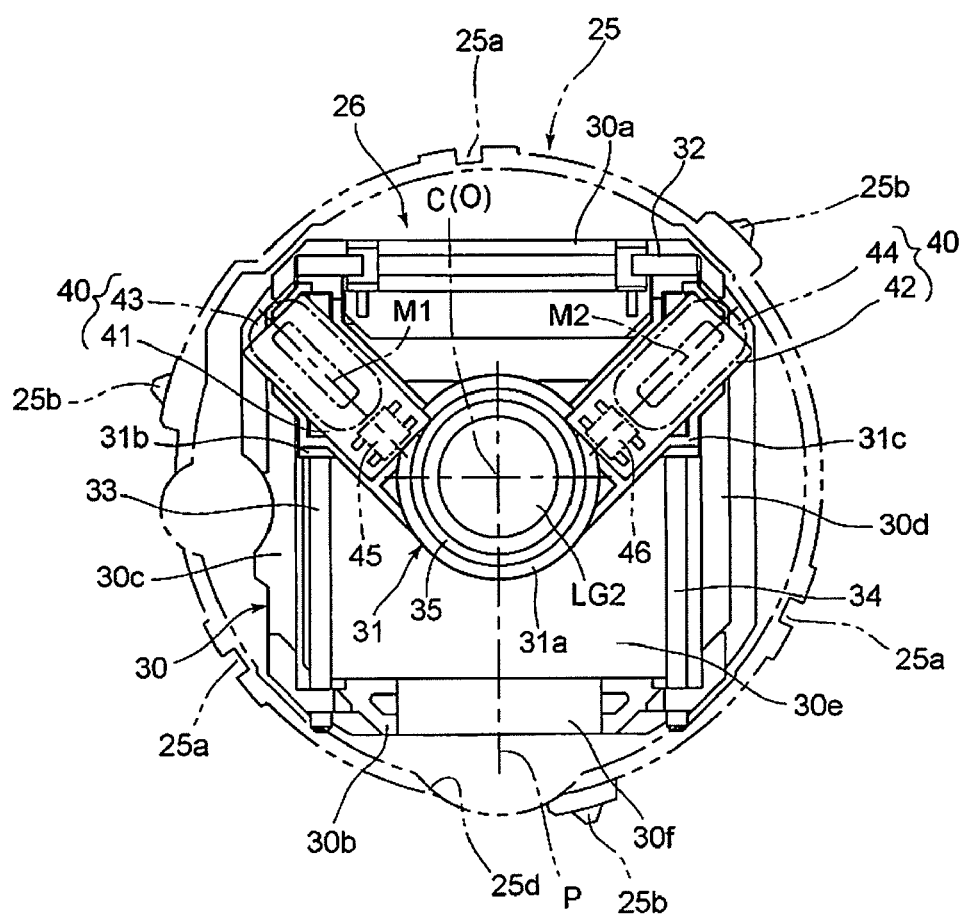
FIG. 7 is a front elevational view of the anti-shake unit in a ready-to-photograph state, in which the second lens group is in an anti-shake driving position, viewed from the front in the optical axis direction.
Figure 7:
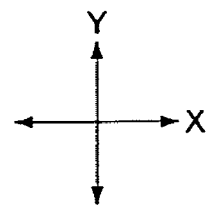
Figure 8:
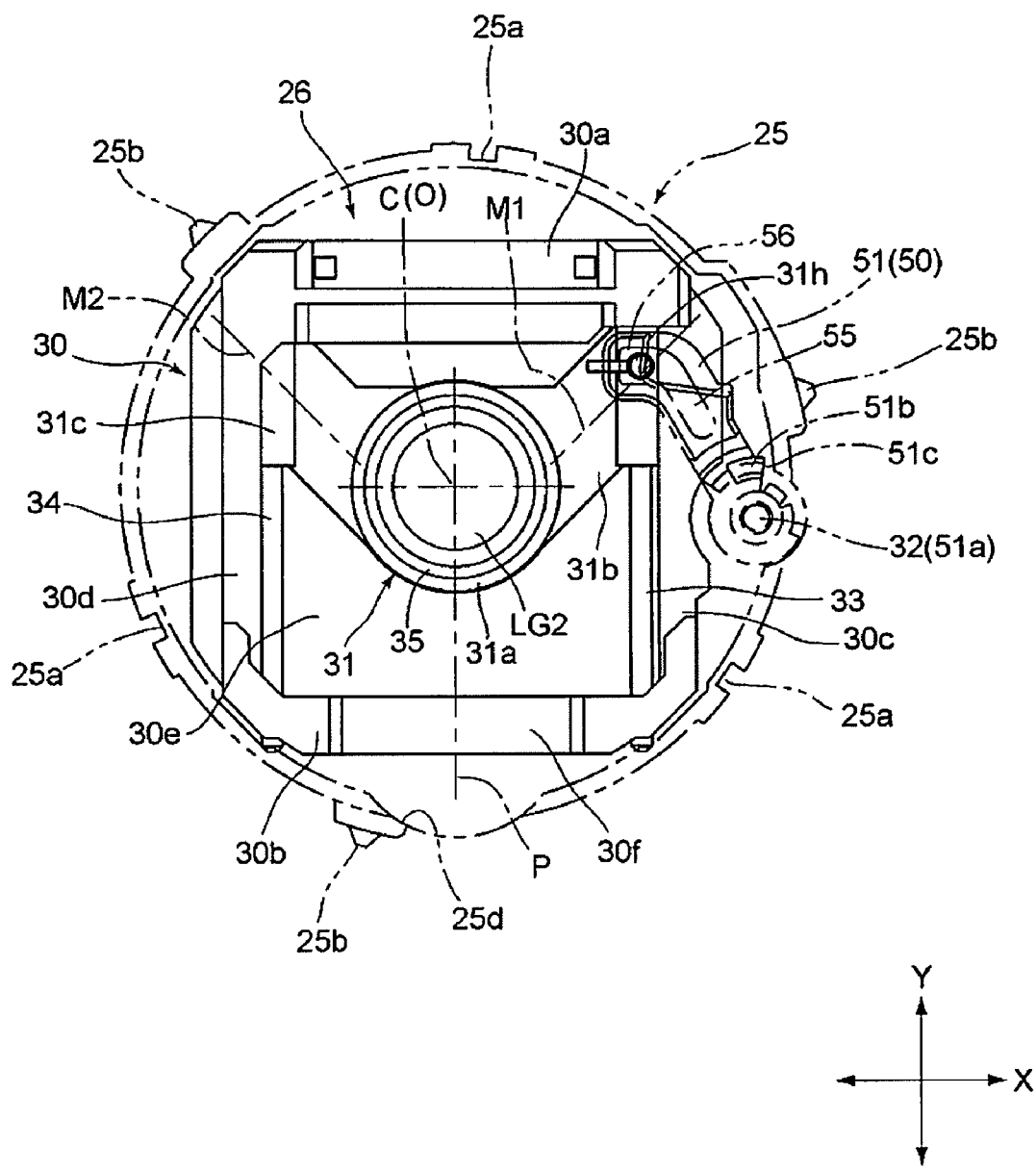
FIG. 8 is a rear elevational view of the anti-shake unit in a ready-to-photograph state, viewed from the rear in the optical axis direction.
Figure 9:
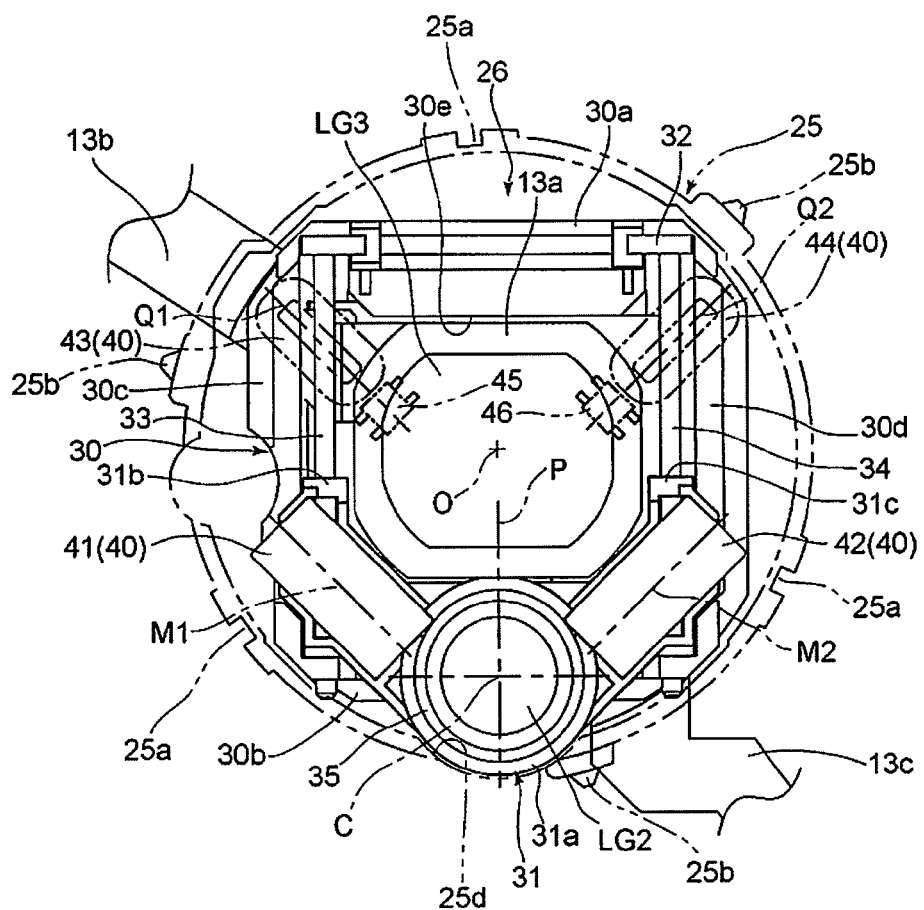
FIG. 9 is a front elevational view of the anti-shake unit in the accommodated state of the zoom lens barrel, in which the second lens group is in a removed position, viewed from the rear in the optical axis direction.

In a state where the permanent magnets 41 and 42 are mounted in the magnet holding portions 31f and 31g, respectively, the permanent magnets 41 and 42 are positioned to be substantially symmetrical with respect to a removing direction center line P (shown in FIGS. 7 through 10) which passes through a center C of the second lens group LG2 and extends in the Y-direction. More specifically, the magnetic pole boundary lines M1 and M2 are inclined to each other so as to increase the distance from the removing direction center line P (so as to increase the distance between the magnetic pole boundary lines M1 and M2 in the X-direction) in the upward direction (toward the anti-shake driving position which will be discussed later) from the bottom side in the Y-direction (toward the removed position (displaced position) which will be discussed later). The inclination angle of each magnetic pole boundary line M1 and M2 with respect to the removing direction center line P is set at an approximately 45 degrees. Namely, the lengthwise directions (the magnetic pole boundary lines M1 and M2) of the permanent magnets 41 and 42 are substantially orthogonal to each other. In addition, the cylindrical lens holder portion 31a of the second movable stage 31 is positioned at a point of intersection of extension lines of the magnetic pole boundary lines M1 and M2, and the second lens group LG2 that is held by the cylindrical lens holder portion 31a is positioned between common ends (lower short sides with respect to FIGS. 7 through 10) of the permanent magnets 41 and 42 which face the cylindrical lens holder portion 31a of the second movable stage 31. Additionally, as shown in FIGS. 7 and 9, the permanent magnet 41 lies at a position in the X-direction so as to overlap the Y-guide shaft 33 as viewed from the front of the zoom lens barrel 10, and the permanent magnet 42 lies at a position in the X-direction so as to overlap the Y-guide shaft 34 as viewed from the front of the zoom lens barrel 10. Although FIGS. 7 through 10 show a state where the removing direction center line P (the center C of the second lens group LG2) and the optical axis O are located at the same position in the X-direction, the aforementioned positional relationship between the permanent magnets 41 and 42 and the Y-guide shafts 33 and 34, in which the permanent magnets 41 and 42 are positioned to overlap the Y-guide shafts 33 and 34, respectively (as viewed from the front of the zoom lens barrel 10), is maintained even if the first movable stage 30 moves in the X-direction within the moving range thereof.

Figure 4:
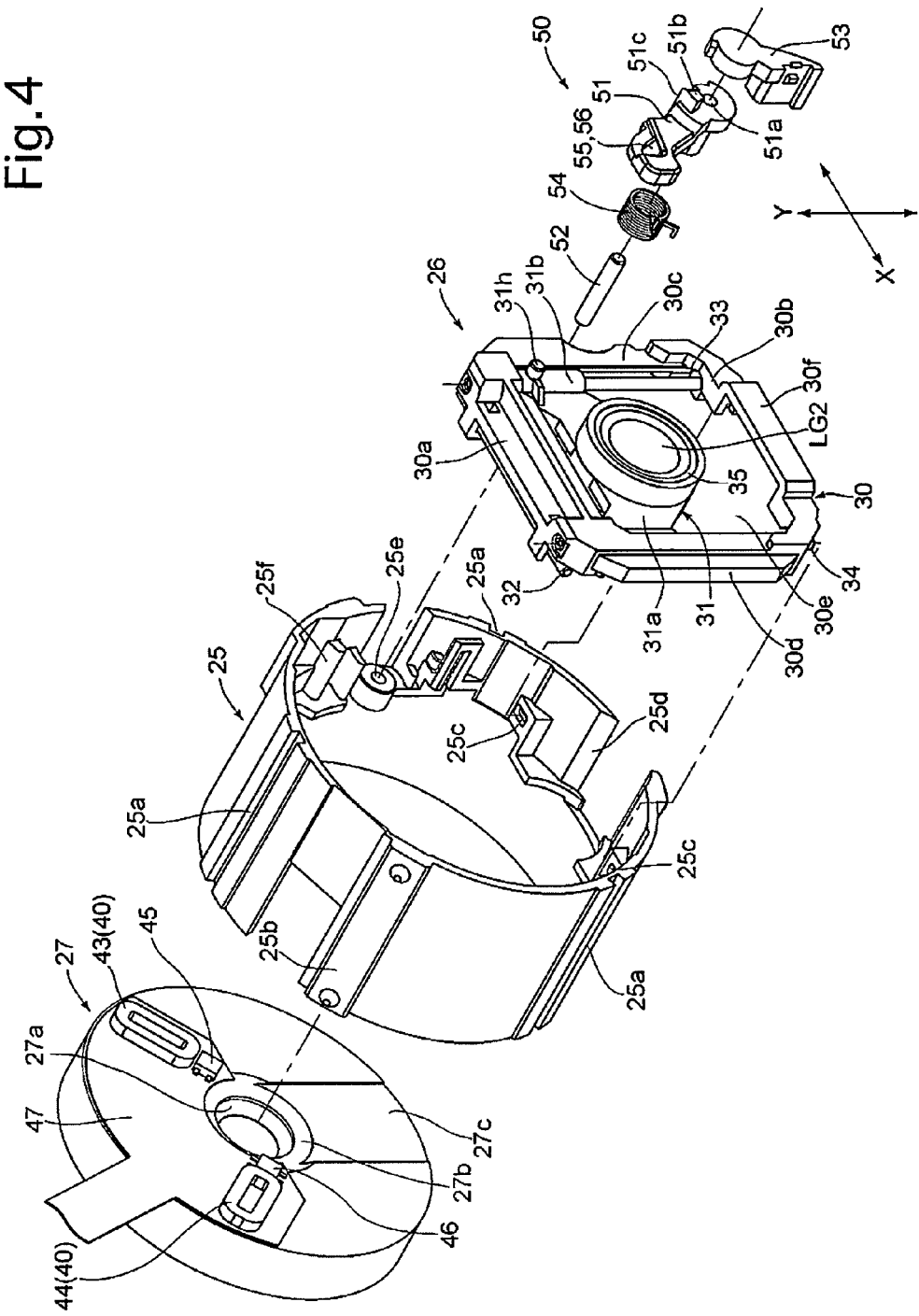
FIG. 4 is an exploded rear perspective view of a support structure for the second lens group that serves as an element of an imaging optical system of the zoom lens barrel.
Figure 5:
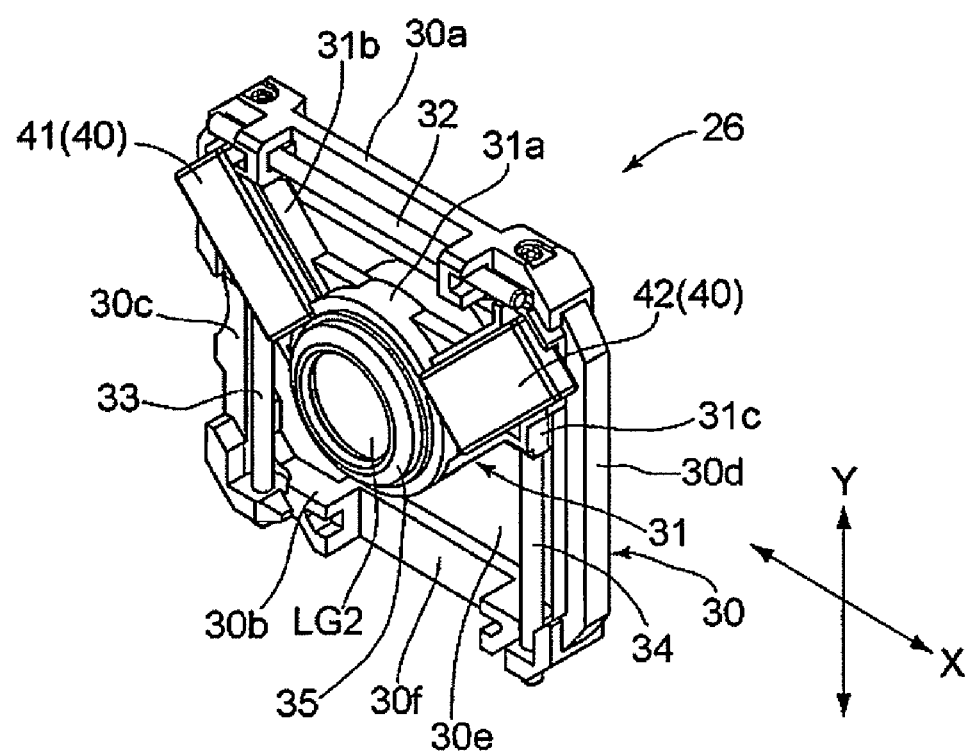
FIG. 5 is a front perspective view of an anti-shake unit that supports the second lens group.

As shown in FIG. 4, the coils 43 and 44 are supported by the shutter unit 27 on a rear surface thereof. As shown in FIGS. 7 and 9, as viewed from the front of the zoom lens barrel 10, the coil 43 lies at a position in the X-direction to overlap the Y-guide shaft 33 while the coil 44 lies at a position in the X-direction to overlap the Y-guide shaft 34. Additionally, in the Y-direction, the coils 43 and 44 are positioned between the X-guide shaft 32 and an imaginary line which extends in the X-direction and passes through the optical axis O. The coils 43 and 44 are substantially identical in shape and size to each other, and each of the coils 43 and 44 is an air-core coil which includes a pair of elongated portions substantially parallel to each other and a pair of curved (U-shaped) portions which connect the pair of elongated portions. The coil 43 is positioned so that a long-axis directional line Q1 thereof (see FIG. 9) is substantially parallel to the magnetic pole boundary line M1 of the permanent magnet 41 and the coil 44 is positioned so that a long-axis directional line Q2 thereof (see FIG. 9) is substantially parallel to the magnetic pole boundary line M2 of the permanent magnet 42. Upon the coils 43 and 44 being energized, a current is passed through the pair of elongated portion of each coil 43 and 44 in the associated long-axis directional line Q1 or Q2.

A position sensor 45 is installed on a rear surface of the shutter unit 27 between the coil 43 and the shutter opening 27a and a position sensor 46 is installed on a rear surface of the shutter unit 27 between the coil 44 and the shutter opening 27a. The position sensors 45 and 46 are for detecting magnetic field strength. The positions of the second lens group LG2, which moves with the permanent magnets 41 and 42, in the X-direction and the Y-direction can be detected by the position sensors 45 and 46.

The coils 43 and 44 and the position sensors 45 and 46 are provided as a module mounted on a shutter FPC 47 fixed to the back of the shutter unit 27. The shutter FPC 47 is connected to the control circuit 60. The passage of current through each coil 43 and 44 is controlled by the control circuit 60. In addition, the positional information obtained by the position sensors 45 and 46 is input to the control circuit 60.

In the electromagnetic actuator 40, upon the coil 43 being energized in a state where the coil 43 is positioned in the magnetic field of the permanent magnet 41 with the permanent magnet 41 and the coil 43 facing each other in the optical axis direction, a driving force is generated in a direction substantially orthogonal to the magnetic pole boundary line M1 and the long-axis direction line Q1 in a plane orthogonal to the optical axis O. In addition, upon the coil 44 being energized in a state where the coil 44 is positioned in the magnetic field of the permanent magnet 42 with the permanent magnet 42 and the coil 44 facing each other in the optical axis direction, a driving force is generated in a direction substantially orthogonal to the magnetic pole boundary line M2 and the long-axis direction line Q2 in a plane orthogonal to the optical axis O. The direction of action of each of the two driving forces intersects both the X-direction and the Y-direction at an angle of approximately 45 degrees, so that the first movable stage 30 and the second movable stage 31 can be freely moved in the X-direction and the Y-direction, respectively, by controlling the passage of current through each of the coils 43 and 44. The controllable range in which the position of the second lens group LG2 can be controlled by the electromagnetic actuator 40 is herein referred to as the anti-shake driving position (anti-shake driving range/photographing position) of the second lens group LG2 (the second movable stage 31). When the second lens group LG2 is in the anti-shake driving position, the center C of the second lens group LG2 is in a predetermined range having its center on the optical axis O.

The maximum amount of movement of the second movable stage 31 in the Y-direction that is guided by the pair of Y-guide shafts 33 and 34 is greater than the maximum driving amount of the second lens group LG2 in the Y-direction that is given to the second movable stage 31 by the electromagnetic actuator 40. As shown in FIGS. 7, 8, 11, 12 and 16, when the second lens group LG2 (the second movable stage 31) is in the aforementioned anti-shake driving position, the upper ends of the support arms 31b and 31c of the second movable stage 31 are positioned in the close vicinity of the upper side portion 30a of the first movable stage 30. More specifically, when the second lens group LG2 is in a position where the center C thereof coincides with the optical axis O, a clearance is provided between the upper side portion 30a of the first movable stage 30 and the upper ends of the support arms 31b and 31c, thus allowing the second movable stage 31 to move in either of the upward and downward directions in the Y-direction from that particular position by the electromagnetic actuator 40. As shown in FIGS. 9, 10, 14, 15 and 18, the second movable stage 31 can be moved downwardly, down to a position where the lower ends of the support arm portions 31b and 31c are positioned in the close vicinity of the lower side portion 30b of the first movable stage 30. When the second movable stage 31 is positioned at the lower movement limit thereof, neither the permanent magnet 41 nor the permanent magnet 42 faces the associated coil 43 or 44 in the optical axis direction, and the second lens group LG2 (the second movable stage 31) is positioned out of the anti-shake driving position, in which the position of the second lens group LG2 can be controlled by the electromagnetic actuator 40. This position of the second lens group LG2, in which the position of the second lens group LG2 cannot be controlled by the electromagnetic actuator 40 is herein referred to as the removed position (displaced position) of the second lens group LG2 (the second movable stage 31). When the second lens group LG2 (the second movable stage 31) is in the removed position, the second lens group LG2 is moved downward to a position to overlap the lower side portion 30b of the first movable stage 30 in the optical axis direction; however, the second movable stage 31 can be moved down with no interference with the lower side portion 30b of the first movable stage 30 because the rear sides of the cylindrical lens holder portion 31a and the second lens group frame 35 enter the offset recess 30f. The second lens group moving ring 25 is provided with an accommodation recess (positioning recess) 25d which allows part of the cylindrical lens holder portion 31a to enter therein. The accommodation recess 25d has a radial through portion formed at an approximate center in the X-direction, and the second lens group moving ring 25 is provided, on the opposite sides of this radial through portion of the accommodation recess 25d in the circumferential direction, with a pair of curved recess surfaces which are shaped substantially symmetrically and correspond with the outer surface of the cylindrical lens holder portion 31a. If the second movable stage 31 is moved to the removed position with the first movable stage 30 deviating from the center of the moving range thereof in the X-direction, the first movable stage 30 that supports the second movable stage 31 is guided to an approximate center of the moving range of the first movable stage 30 in the X-direction by the engagement between an outer surface of the cylindrical lens holder portion 31a and the one of curved recess surfaces, which are formed on the opposite sides of the accommodation recess 25d. On the other hand, when the first movable stage 30 is positioned in the vicinity of the center of the moving range thereof in the X-direction, the second movable stage 31 can be moved to the removed position without making the cylindrical lens holder portion 31a come in contact with the pair of curved recess surfaces of the accommodation recess 25d. The second movable stage 31 which has reached the removed position is prevented from further moving downward by the engagement of the lower ends of the support arms 31b and 31c of the second movable stage 31 with the lower side portion 30b of the first movable stage 30.

As shown in FIG. 4, the shutter unit 27 is provided, on the back thereof around the shutter opening 27a, with a central circular recess 27b that is recessed forward. The front end of the cylindrical lens holder portion 31a (the second lens group frame 35) of the second movable stage 31 enters the central circular recess 27b when the second lens group LG2 is positioned in the anti-shake driving position. The central circular recess 27b is formed to have a size so as not to interfere with the cylindrical lens holder portion 31a even throughout the entire anti-shake driving range when the second lens group LG2 is moved in the X-direction and the Y-direction by the electromagnetic actuator 40 while in an anti-shake driving position. In addition, the shutter unit 27 is provided on a rear surface thereof with a straight recess 27c which extends linearly downward from the central circular recess 27b so as to allow the front end of the cylindrical lens holder portion 31a (the second lens group frame 35) to enter when the second lens group LG2 is positioned in the moving range thereof in the Y-direction from the anti-shake driving position to the removed position.

The controllable range in which the position of the second lens group LG2 can be controlled by the electromagnetic actuator 40 is limited to the anti-shake driving position (anti-shake driving range), and the driving of the second lens group LG2 (the second movable stage 31) in the Y-direction when the second lens group LG2 is positioned in between the anti-shake driving position and the removed position (which deviates from the anti-shake driving position) is performed by an insertion/removal drive mechanism 50 provided separately from the electromagnetic actuator 40. The insertion/removal drive mechanism 50 is provided with an insertion/removal-operation control lever (insertion/removal operational member/swing member) 51 which is positioned inside the second lens group moving ring 25 and pivoted about a support shaft 52 fixed to the second lens group moving ring 25. As shown in FIG. 4, the support shaft 52 is inserted into a shaft hole 51a, the front end of the support shaft 52 is inserted into a shaft support hole 25e formed in the second lens group moving ring 25 to be supported thereby, and the rear end of the support shaft 52 is supported by a lever retaining member 53 which is fixed to the second lens group moving ring 25. In this supported state of the support shaft 52, the axis of the support shaft 52 is substantially parallel to the optical axis O, and the insertion/removal-operation control lever 51 is swingable about the support shaft 52.

As shown in FIGS. 16 through 19, an insertion/removal-operation guide groove 55 and a displacement prevention groove 56 are formed continuously and are formed through the insertion/removal-operation control lever 51. The insertion/removal-operation guide groove 55 extends in a radial direction with respect to the axis of the shaft hole 51a. One of the pair of opposed side surfaces in the insertion/removal-operation guide groove 55 serves as a removing-operation guide surface 55a which guides the second movable stage 31 to the removed position from the anti-shake driving position. The other of the pair of opposed side surfaces in the insertion/removal-operation guide groove 55 serves as an inserting-operation guide surface 55b which guides the second movable stage 31 to the anti-shake driving position from the removed position. The displacement prevention groove 56 is communicatively connected to the radially outer end (upper end with respect to FIG. 17) of the insertion/removal-operation guide groove 55 and includes a downward displacement prevention surface 56a and an upward displacement prevention surface 56b which face each other. The width of the displacement prevention groove 56 (i.e., the distance between the downward displacement prevention surface 56a and the upward displacement prevention surface 56b) is greater than the width of the insertion/removal-operation guide groove 55 (i.e., the distance between the removing-operation guide surface 55a and the inserting-operation guide surface 55b.

The second movable stage 31 is provided with a position control pin 31h which projects rearward from the support arm 31b. The position control pin 31h is positioned in the insertion/removal-operation guide groove 55 or the displacement prevention groove 56 in accordance with the swing position of the insertion/removal-operation control lever 51. As shown in FIGS. 10, 14, 15, 18 and 19, when the second movable stage 31 is in the removed position, the insertion/removal-operation control lever 51 is held at a specific angular position (hereinafter referred to as "removed-lens holding position") at which the direction of elongation thereof from the rotational axis (the support shaft 52) extends obliquely downwards while the position control pin 31h is engaged in the insertion/removal-operation guide groove 55. In this state shown in FIGS. 10, 14, 15, 18 and 19, the position control of the second movable stage 31 in the Y-direction is carried out by sliding engagement of the position control pin 31h with the removing-operation guide surface 55a and the inserting-operation guide surface 55b. A clockwise rotation of the insertion/removal-operation control lever 51 from this state causes the inserting-operation guide surface 55b to press the position control pin 31h upward, thus moving the second movable stage 31 toward the anti-shake driving position from the removed position.

When the second movable stage 31 is in the anti-shake driving position, the insertion/removal-operation control lever 51 is held at a specific angular position (hereinafter referred to as "lens-insertion position") at which the direction of elongation thereof from the rotational axis (the support shaft 52) extends obliquely upwards while the position control pin 31h is engaged (positioned) in the displacement prevention groove 56 as shown in FIGS. 8, 11, 12, 16 and 17. In this state shown in FIGS. 8, 11, 12, 16 and 17, the direction of extension (lengthwise direction) of the displacement prevention groove 56 is substantially parallel to the X-direction and no position control for the position control pin 31h in the X-direction is carried out, and accordingly, the insertion/removal-operation control lever 51 does not interfere with movements of the first movable stage 30 and the second movable stage 31 in the X-direction that are caused by the electromagnetic actuator 40. In addition, the displacement prevention groove 56 is formed greater in width than the insertion/removal-operation guide groove 55 so that a sufficient clearance is provided between the position control pin 31h and each of the downward displacement prevention surface 56a and the upward displacement prevention surface 56b so as not to interfere with the movement of the second movable stage 31 in the Y-direction that is caused by the electromagnetic actuator 40. When the insertion/removal-operation control lever 51 is in the lens-insertion position, the position of the second movable stage 31 is controlled by the electromagnetic actuator 40; however, the second movable stage 31 can be prevented from deviating toward the removed position beyond the anti-shake driving range (i.e., beyond the controllable range in which the position of the second lens group LG2 can be controlled by the electromagnetic actuator 40) by making the position control pin 31h come in contact with the downward displacement prevention surface 56a. In addition, the second movable stage 31 can be prevented from deviating in a direction away from the removed position beyond the anti-shake driving position by making the position control pin 31h come in contact with the upward displacement prevention surface 56b. However, it is possible that the second movable stage 31 be prevented from deviating in a direction away from the removed position beyond the anti-shake driving position by making the upper side portion 30a of the first movable stage 30 come in contact with each of the pair of support arms 31b and 31c of the second movable stage 31 instead of making the position control pin 31h come in contact with the upward displacement prevention surface 56b.

Rotating the insertion/removal-operation control lever 51 from the lens-insertion position toward the removed-lens holding position with the second movable stage 31 (the second lens group LG2) in the anti-shake driving position causes the removing-operation guide surface 55a to press the position control pin 31h downward to move the second movable stage 31 from the anti-shake driving position to the removed position.

The insertion/removal-operation control lever 51 is biased to rotate toward the lens-insertion position by a lever biasing spring (torsion coil spring) 54, and the second lens group moving ring 25 is provided on an inner peripheral surface thereof with a stopper 25f with which the insertion/removal-operation control lever 51 comes in contact by the biasing force of the lever biasing spring 54. Accordingly, in a state where no extra external force is exerted on the insertion/removal-operation control lever 51, the insertion/removal-operation control lever 51 is held at the lens-insertion position, so that the second movable stage 31 is held in the anti-shake driving position. The image sensor holder 15 is provided with a removing-operation control projection (removing-operation guide member) 57 (see FIGS. 10 through 15, 18 and 19) which projects forward in the optical axis direction. Rearward movement of the second lens group moving ring 25 toward the image sensor holder 15 in the optical axis direction causes the removing-operation control projection 57 to press the insertion/removal-operation control lever 51 to thereby rotate the insertion/removal-operation control lever 51 toward the removed-lens holding position from the lens insertion position against the biasing force of the lever biasing spring 54. More specifically, the removing-operation control projection 57 is provided at the front end thereof with an end-face cam 57a, and retracting movement of the second lens group moving ring 25 toward the removing-operation control projection 57 causes a cam-contacting portion 51b that is formed on the insertion/removal-operation control lever 51 to come in contact with the end-face cam 57a (see FIG. 13). Thereafter, a further retracting movement of the second lens group moving ring 25 with the cam-contacting portion 51b being in contact with the end-face cam 57a causes a component force which makes the insertion/removal-operation control lever 51 rotate toward the removed-lens holding position to be created from the rearward moving force of the second lens group moving ring 25 in the optical axis direction. Upon the insertion/removal-operation control lever 51 reaching the removed-lens holding position, a removed-lens holding surface 57b which is formed on the removing-operation control projection 57 on a side thereof extending substantially parallel to the optical axis O is engaged with a removed-lens holding surface 51c formed on the insertion/removal-operation control lever 51 so that the insertion/removal-operation control lever 51 continues to be held in the removed-lens holding position.

Operations of the zoom lens barrel 10 that has the above described structure will be discussed hereinafter. In the accommodated state of the zoom lens barrel 10 shown in FIG. 1, the zoom motor 62 is actuated to rotate in a lens barrel advancing direction to thereby rotate the aforementioned zoom gear (not shown) upon a main switch 66 (FIG. 20) of an imaging device to which the zoom lens barrel 10 is mounted being turned ON. The rotation of the zoom gear causes the helicoid ring 16 and the first advancing barrel 17 to move forward while rotating by being guided via the female helicoidal threads 14a of the housing 14. The first linear guide ring 20 linearly moves forward with the helicoid ring 16 and the first advancing barrel 17. At this time, the cam ring 21, which is given a rotational force from the first advancing barrel 17, moves forward in the optical axis direction by an amount of movement corresponding to the sum of the amount of the forward linear movement of the first linear guide ring 20 and the amount of the forward movement of the cam ring 21 by a lead structure (composed of the plurality of radially outer projections 21a of the cam ring 21 and the lead groove portions of the plurality of guide slots 20b of the first linear guide ring 20) provided between the cam ring 21 and the first linear guide ring 20. Upon the helicoid ring 16 and the cam ring 21 being advanced to respective predetermined positions thereof, the functions of the rotating/advancing structures (helicoid and lead structures) of the helicoid ring 16 and the cam ring 21 are cancelled, so that the helicoid ring 16 and the cam ring 21 only rotate at respective axial fixed positions thereof in the optical axis direction.

A rotation of the cam ring 21 causes the second lens group moving frame 25, which is guided linearly via the second linear guide ring 22 inside the cam ring 21, to move in the optical axis direction in a predetermined moving manner due to the engagement of the cam followers 25$b$ of the second lens group moving frame 25 with the second-lens-group control cam grooves 21$b$ of the cam ring 21. In addition, the rotation of the cam ring 21 causes the third advancing barrel 28, which is guided linearly via the second advancing barrel 23 outside the cam ring 21, to move in the optical axis direction in a predetermined moving manner due to the relationship between the cam followers 28$b$ with the first-lens-group control cam grooves 21$c$.

Namely, the amount of advancement of the first lens group LG1 from the accommodated state of the zoom lens barrel 10 is determined by the sum of the amount of forward movement of the cam ring 21 relative to the housing 14 and the amount of advancement of the third advancing barrel 28 relative to the cam ring 21, and the amount of advancement of the second lens group LG2 from the accommodated state of the zoom lens barrel 10 is determined by the sum of the amount of forward movement of the cam ring 21 relative to the housing 14 and the amount of advancement of the second lens group moving frame 25 relative to the cam ring 21. A zooming operation is carried out by moving the first lens group LG1 and the second lens group LG2 along the optical axis O while changing the air distance therebetween. When the zoom lens barrel 10 is driven to advance from the accommodated state shown in FIG. 1, the zoom lens barrel 10 firstly moves into a lens barrel advanced state shown in FIG. 2, in which the zoom lens barrel 10 is set at the wide-angle extremity. Subsequently, the zoom lens barrel 10 moves into a lens barrel advanced state shown in FIG. 3, in which the zoom lens barrel 10 is set at the telephoto extremity, by a further rotation of the zoom motor 62 in a lens barrel advancing direction thereof. In the zoom range between the wide-angle extremity and the telephoto extremity, the helicoid ring 16, the first advancing barrel 17 and the cam ring 21 rotate at their respective axial fixed positions, i.e., without moving in the optical axis direction. Upon the aforementioned main switch 66 being turned OFF, the zoom motor 62 is driven to rotate in the lens barrel retracting direction, so that the zoom lens barrel 10 operates in the reverse manner to the above described lens barrel advancing operation to thereby return to the accommodated state shown in FIG. 1.

When the zoom lens barrel 10 is in the ready-to-photograph state between the wide-angle extremity and the telephoto extremity, the third lens group frame 13 that supports the third lens group LG3 moves along the optical axis O to perform a focusing operation by driving the AF motor 61 in accordance with object distance information obtained via a distance measuring device (not shown).

The overall operation of the zoom lens barrel 10 has been discussed above. Operations of the retracting structure of the zoom lens barrel 10 which are related to the operations of the anti-shake unit 26, and the operation of the anti-shake unit 26 in a ready-to-photograph state will be discussed hereinafter.

In the accommodated state of the zoom lens barrel 10 shown in FIG. 1, the third lens group frame 13 has been retracted to the rear movement limit thereof in the close vicinity of the front of the image sensor holder 15, and also the second lens group moving frame 25 has been retracted to the rear movement limit thereof. The insertion/removal-operation control lever 51 is biased to rotate to the lens insertion position by the lever biasing spring 54; however, in a state where the second lens group moving frame 25 is positioned at the rear movement limit thereof, the insertion/removal-operation control lever 51 is prevented from rotating in the biasing direction of the lever biasing spring 54 by the engagement of the removed-lens holding surface 51$c$ with the removed-lens holding surface 57$b$ to be held in the removed-lens holding position (see FIGS. 10, 14, 15, 18 and 19). When the insertion/removal-operation control lever 51 is in the removed-lens holding position, the removing-operation guide surface 55$a$ in the insertion/removal-operation guide groove 55 restricts the upward movement of the position control pin 31$h$, so that the second movable stage 31 that holds the second lens group LG2 is held in the removed position that is eccentric and downward from the optical axis O.

Figure 10:
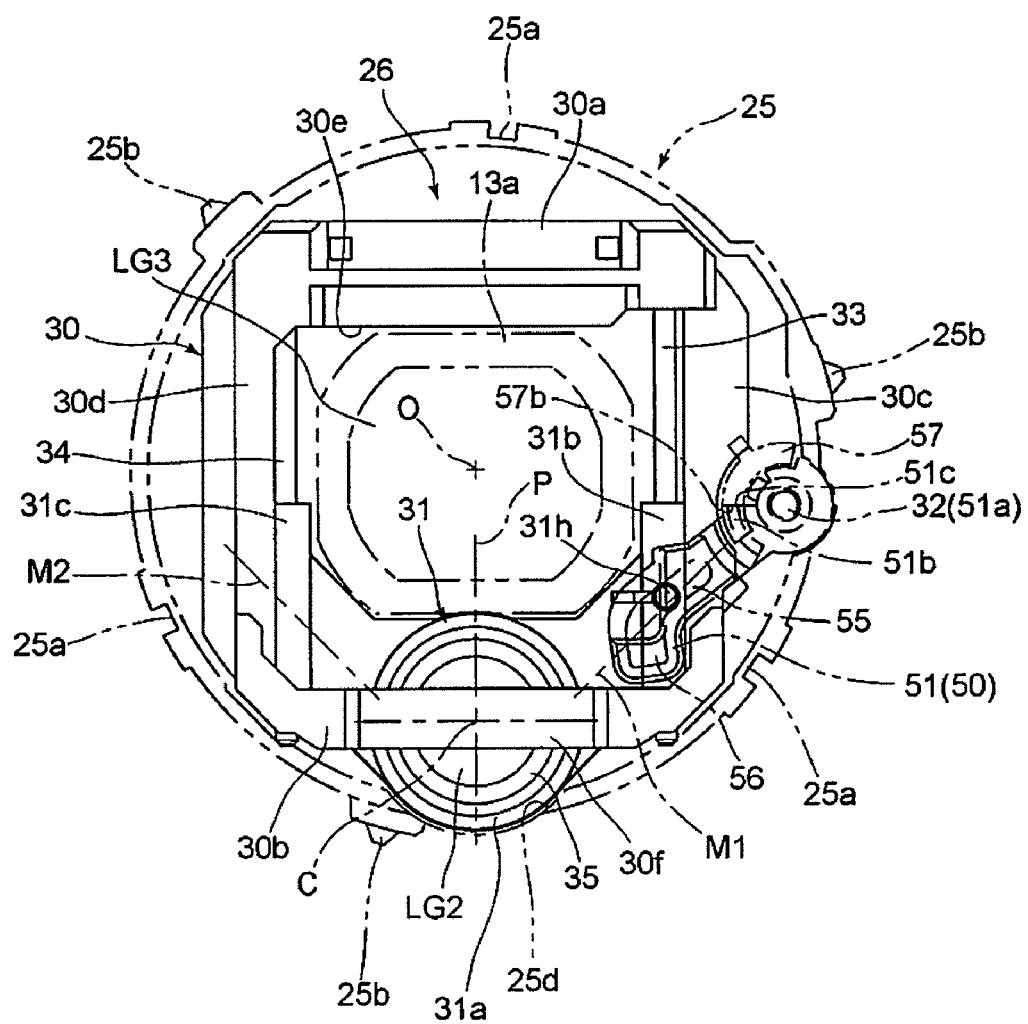
FIG. 10 is a rear elevational view of the anti-shake unit in the accommodated state of the zoom lens barrel, viewed from the rear in the optical axis direction.
Figure 11:
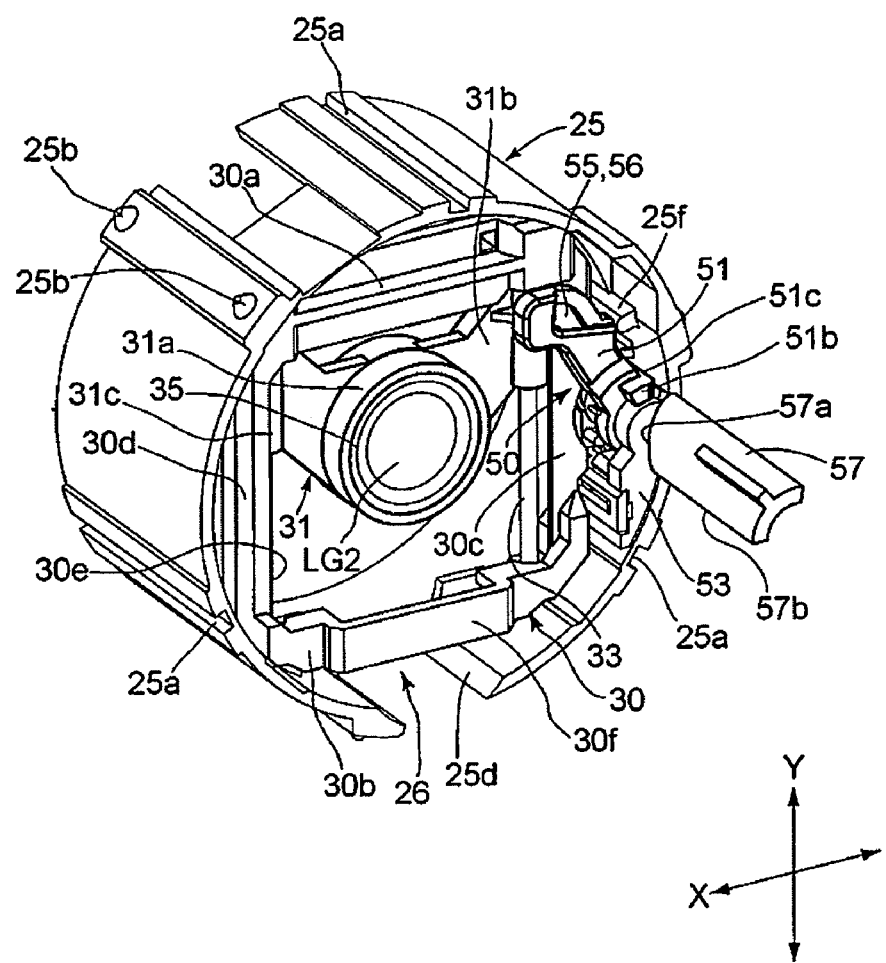
FIG. 11 is a rear perspective view of the second-lens-group support structure in a state where the second lens group is held in the anti-shake driving position.
Figure 12:
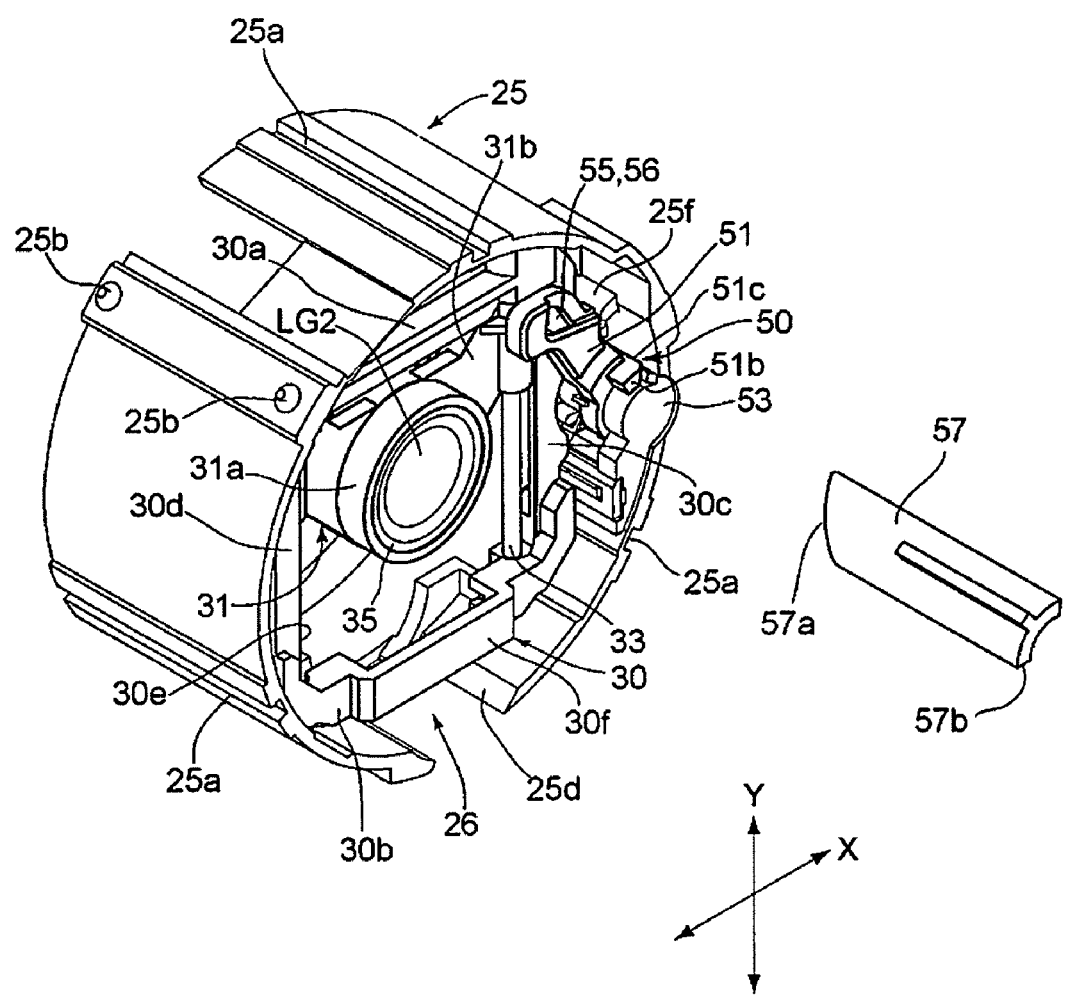
FIG. 12 is a rear perspective view of the second-lens-group support structure, showing the state shown in FIG. 11 at a different angle.
Figure 13:
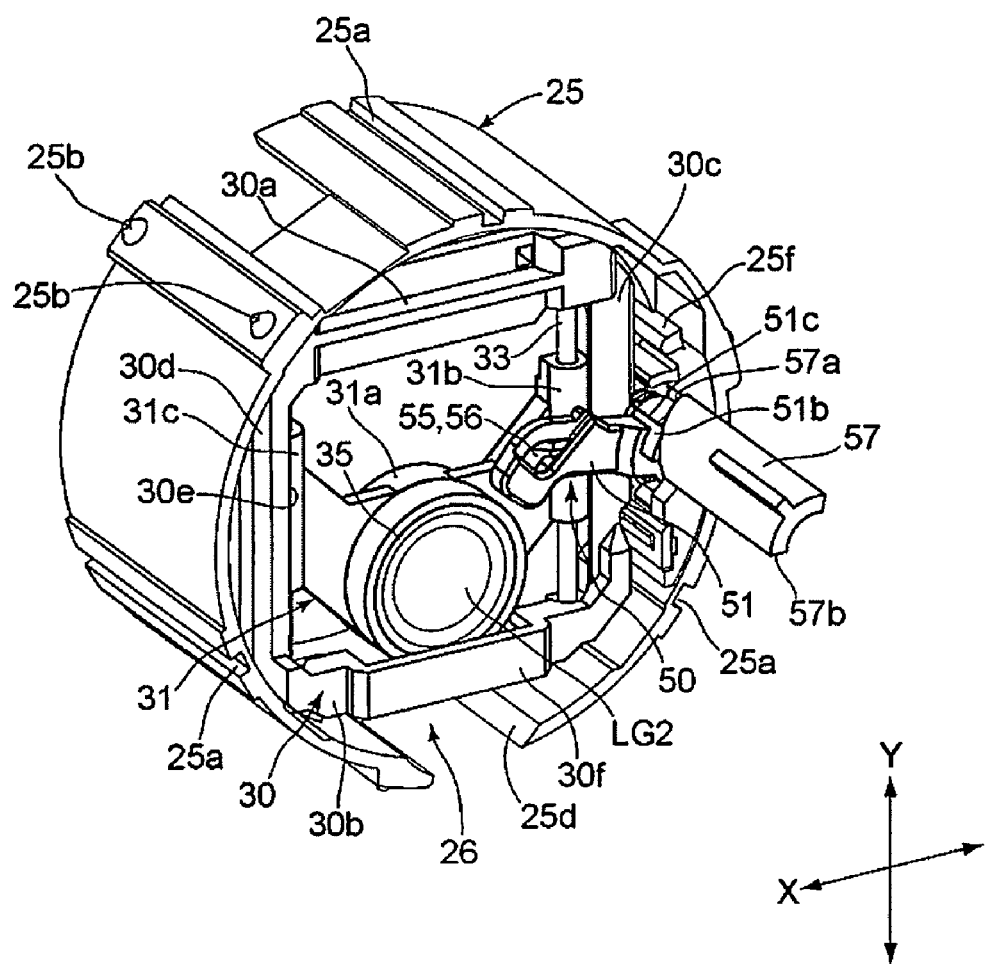
FIG. 13 is a rear perspective view of the second-lens-group support structure in a state where the second lens group is located between the anti-shake driving position and the removed position.
Figure 14:
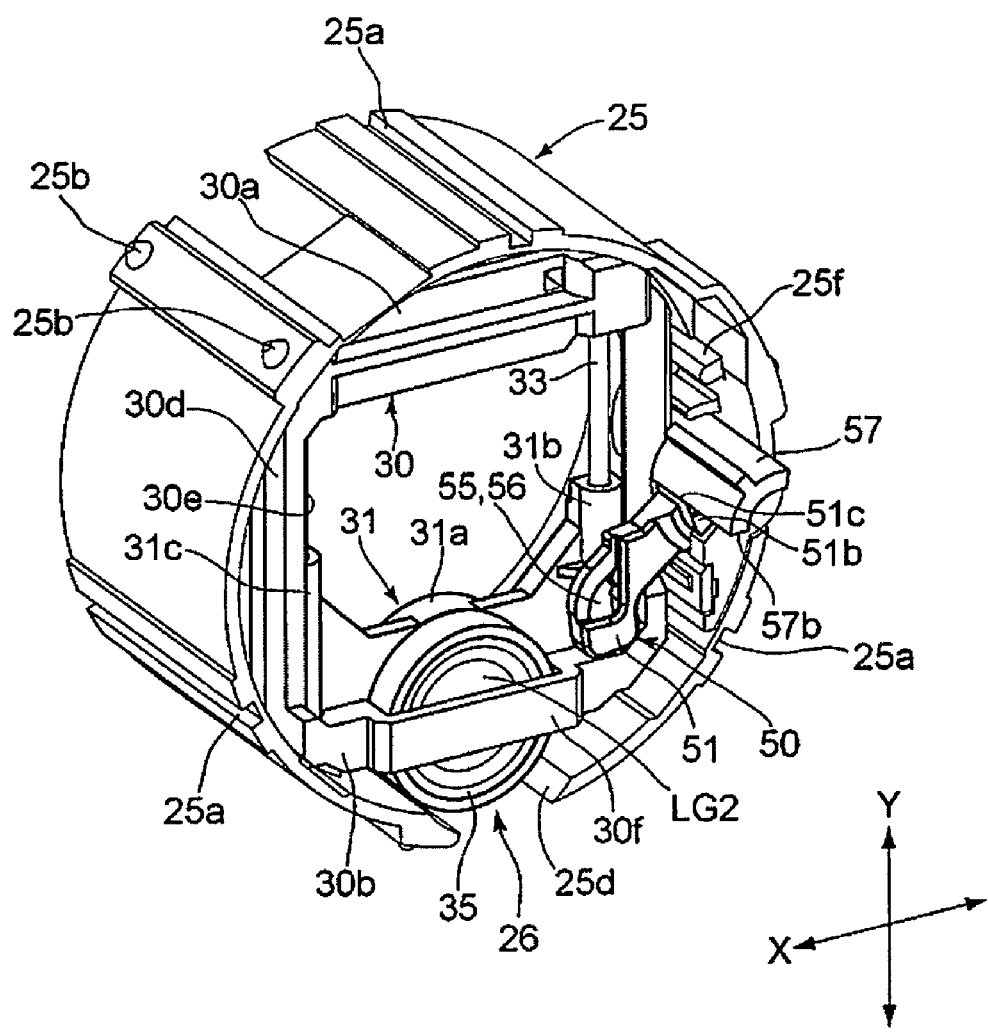
FIG. 14 is a rear perspective view of the second-lens-group support structure in a state where the second lens group is held in the removed position.
Figure 18:
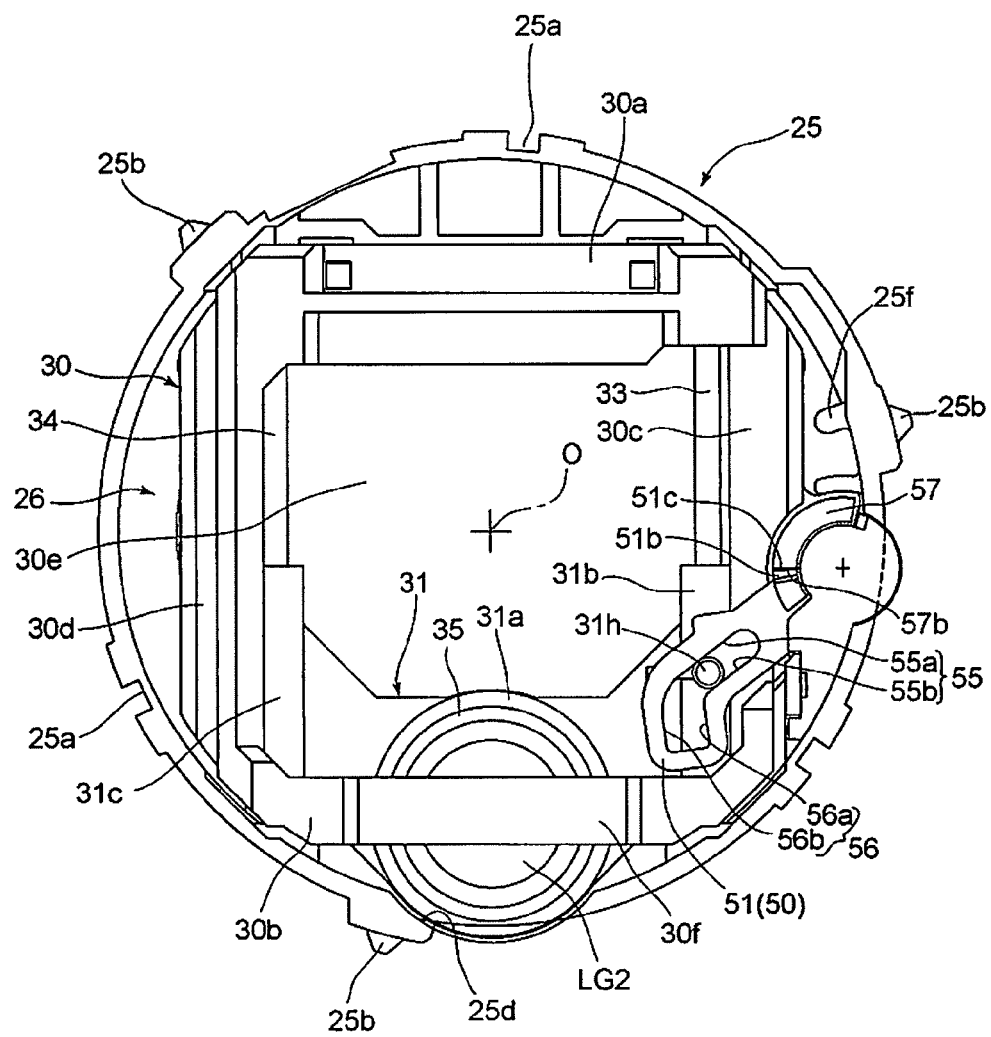
FIG. 18 is a rear elevational view of the insertion/removal drive mechanism and the anti-shake unit in a state where the second lens group is positioned in the removed position, viewed from the rear in the optical axis direction.
Figure 19:
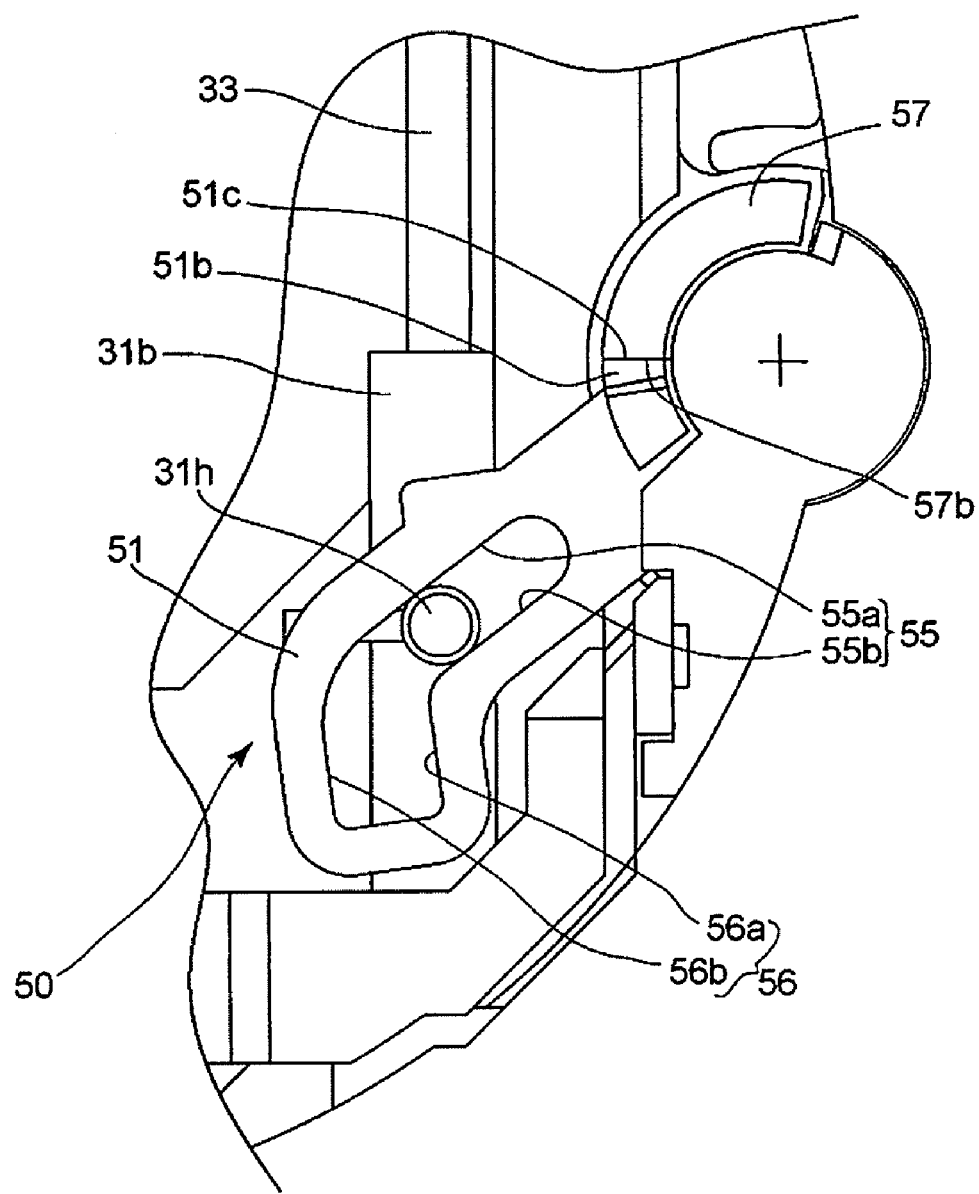
FIG. 19 is an enlarged view of a portion of the insertion/removal drive mechanism shown in FIG. 18.

As can be seen from FIGS. 9, 10 and 18, when the second movable stage 31 is in the removed position, the cylindrical lens holder portion 31$a$ that supports the second lens group LG2 is moved down to a position to overlap the lower side portion 30$b$ of the first movable stage 30 in the Y-direction. As described above, the formation of the offset recess 30$f$ on the lower side portion 30$b$ of the first movable stage 30 prevents the cylindrical lens holder portion 31$a$ and the lower side portion 30$b$ from interfering with each other when the second movable stage 31 is in the removed position. In addition, as shown in FIG. 9, the permanent magnets 41 and 42 are also positioned below the optical axis O when the second movable stage 31 is in the removed position. Since the permanent magnets 41 and 42 and the support arms 31$b$ and 31$c$ that hold the permanent magnets 41 and 42, respectively, are arranged in a V-shaped configuration so that the distance between the permanent magnets 41 and 42 (the support arms 31$b$ and 31$c$) increases in the upward direction in the Y-direction (toward the anti-shake driving position side), the permanent magnet 41 is positioned to overlap the first movable stage 30 in the vicinity of the boundary between the lower side portion 30$b$ and the left lateral side portion 30$c$ as viewed from the front as shown in FIG. 9, while the permanent magnet 42 is positioned to overlap the first movable stage 30 in the vicinity of the boundary between the lower side portion 30$b$ and the right lateral side portion 30$d$ as viewed from the front as shown in FIG. 9. Accordingly, by positioning the second movable stage 31 in the removed position, the open area at the opening 30$e$ of the first movable stage 30 relatively increases, which makes the space domain in the opening 30$e$ in the vicinity of the optical axis O an open space in which the second movable stage 31 does not exist.

As shown in FIGS. 1, 9 and 10, the lens holding frame 13$a$ of the third lens group frame 13 enters the aforementioned open area at the opening 30$e$ (the area in which the second lens group LG2, the second movable stage 31, the permanent magnets 41 and 42 and others are positioned when the zoom lens barrel 10 is in a ready-to-photograph state) that is formed as a result of the movement of the second movable stage 31 to the removed position thereof so that the second lens group LG2 and the third lens group LG3 are positioned side-by-side in the Y-direction. This configuration reduces the length of the imaging optical system in the optical axis direction in the accommodated state of the zoom lens barrel 10, thus achieving a reduction in length of the zoom lens barrel 10.

When the second movable stage 31 is in the removed position, the first movable stage 30 is held in the vicinity of the center in the moving range thereof in the X-direction (i.e., in the vicinity of a position at which the removing direction center line P intersects the optical axis O). As noted above, when the second movable stage 31 is moved to the removed position while being eccentric from the center of the moving range thereof in the X-direction, the first movable stage 30 is guided to an approximate center of the moving range thereof in the X-direction by the engagement between an outer peripheral surface of the cylindrical lens holder portion 31a with the aforementioned pair of curved recess surfaces of the accommodation recess 25d of the second lens group moving ring 25. Since the support arms 31b and 31c and the permanent magnets 41 and 42 are arranged on the second movable stage 31 in a V-shaped configuration with the second lens group LG2 being positioned therebetween, positioning the first movable stage 30 at an approximate center of the moving range thereof in the aforementioned manner makes it possible to arrange the support arms 31b and 31c and the permanent magnets 41 and 42 at positions in the X-direction where the space utilization with respect to the opening 30e of the first movable stage 30 becomes maximum.

In addition, the lens holding frame 13a of the third lens group frame 13 is in the shape of a rectangular frame the four corners of which are chamfered, and the support arms 31b and 31c of the second movable stage 31 and the permanent magnets 41 and 42 are accommodated in a V-shaped space formed between an inner peripheral surface of the second lens group moving ring 25 and the two chamfered portions (two lower chamfered portions) of the lens holding frame 13a on the lower side thereof as shown in FIG. 9 when the lens holding frame 13a is brought into the opening 30e. Additionally, in the accommodated state of the zoom lens barrel 10 shown in FIG. 9, the cylindrical lens holder portion 31a of the second movable stage 31 is positioned between the lower side of the lens holding frame 13a, which is positioned between the aforementioned two lower chamfered portions of the lens holding frame 13a, and an inner peripheral surface of the second lens group moving ring 25. Although the diameter of the cylindrical lens holder portion 31a is greater than the width of either of the support arms 31b and 31c, the cylindrical lens holder portion 31a can be accommodated to be in the position shown in FIG. 9 without interfering with the second lens group moving ring 25 by bringing part of the cylindrical lens holder portion 31a into the accommodation recess 25d. Accordingly, the retracting structure of the zoom lens barrel 10 is superior in space utilization also in regard to the relationship between the second movable stage 31, the third lens group frame 13 and the second lens group moving ring 25.

Upon the zoom lens barrel 10 being advanced from the accommodated position shown in FIG. 1 by an operation of the zoom motor 62 to thereby move the second lens group moving frame 25 forward in the optical axis direction, the insertion/removal-operation control lever 51 is disengaged from the removing-operation control projection 57 to thereby cancel the rotation restriction by the removed-lens holding surface 57b, which causes the insertion/removal-operation control lever 51 to rotate from the removed-lens holding position (see FIGS. 10, 14, 15, 18 and 19) toward the lens insertion position (see FIGS. 8, 11, 12, 16 and 17) by the biasing force of the lever biasing spring 54. Thereupon, the inserting-operation guide surface 55b in the insertion/removal-operation guide groove 55 presses the position control pin 31h upward to move the second movable stage 31 toward the anti-shake driving position in the Y-direction. At this stage, the anti-shake unit 26 has been further moved forward than the third lens group frame 13 and the lens holding frame 13a of the third lens group frame 13 has been moved out of the opening 30e of the first movable stage 30, and accordingly, the second movable stage 31 which moves toward the anti-shake driving position does not interfere with the third lens group frame 13. When the second movable stage 31 is moved upward by certain degree via the insertion/removal-operation control lever 51, the permanent magnets 41 and 42 face the coils 43 and 44, respectively, and the anti-shake unit 26 moves into a state where the positions of the first movable stage 30 and the second movable stage 31 can be controlled by the electromagnetic actuator 40, i.e., the second movable stage 31 (the second lens group LG2) reaches the anti-shake driving position. As noted above, when the second movable stage 31 is in the anti-shake driving position, the position control pin 31h is loosely engaged in the displacement prevention groove 56 and allowed to move in the X-direction and the Y-direction, and the positions of the first movable stage 30 and the second movable stage 31 are controlled by the electromagnetic actuator 40.

The movement of the second movable stage 31 to the anti-shake driving position that is caused by the insertion/removal-operation control lever 51 is completed before the zoom lens barrel 10 reaches the wide-angle extremity position thereof shown in FIG. 2. When the second movable stage 31 is in the anti-shake driving position, the insertion/removal-operation control lever 51 is disengaged forwardly from the removing-operation control projection 57, and the cam-contacting portion 51b and the end-face cam 57a are spaced away from each other in the optical axis direction while facing each other in the optical axis direction. From thereafter until the lens barrel retracting operation is again performed, the insertion/removal-operation control lever 51 and the removing-operation control projection 57 do no come in contact with each other, so that the second movable stage 31 continues to be held in the anti-shake driving position. Although the position of the second lens group moving ring 25 in the optical axis direction varies in accordance with rotation of the cam ring 21 in the zoom range from the wide-angle extremity to the telephoto extremity, the insertion/removal-operation control lever 51 does not come in contact with the removing-operation control projection 57 since the position of the second lens group moving ring 25 in the vicinity of the wide-angle extremity position shown in FIG. 2 corresponds to the rear movement limit of the second lens group moving ring 25 within the zoom range (in the ready-to-photograph state). Accordingly, the second movable stage 31 is held in the anti-shake driving position over the entire zoom range. Even in the case where an impact is applied to the anti-shake unit 26 or the passage of current through each of the coils 43 and 44 is cut off to stop holding the first movable stage 30 and the second movable stage 31 by the electromagnetic actuator 40, the engagement between the position control pin 31h and each of the downward displacement prevention surface 56a and the upward displacement prevention surface 56b of the displacement prevention groove 56 of the insertion/removal-operation control lever 51 prevents the second lens group LG2 (the second movable stage 31) from deviating from the anti-shake driving position, so that the anti-shake unit 26 can at anytime be returned to a state where the positions of the first movable stage 30 and the second movable stage 31 can be controlled by the electromagnetic actuator 40.

In the zoom range, displacements (image shake) of an object image focused on the light receiving surface of the image sensor 12 can be reduced by driving the first movable stage 30 and the second movable stage 31 in the X-direction and the Y-direction by the electromagnetic actuator 40 in accordance with the direction and magnitude of vibrations applied to the zoom lens barrel 10. More specifically, the angular velocity around the X-axis and the angular velocity around the Y-axis are detected by the X-gyro sensor 64 and the Y-gyro sensor 65, respectively, and time-integrated to determine a moving angle, and subsequently, from this moving angle, the moving amounts of the image on a focal plane (the light receiving surface of the image sensor 12) in the X-direction and in the Y-direction are calculated while the driving amounts and the driving directions of the second lens group LG2 for the respective axial directions are calculated in order to cancel out the image shake. Thereupon, in accordance with the calculated values, the passage of current through each of the coils 43 and 44 is controlled.

As described above, each of the permanent magnet 41 and the coil 43 is positioned to overlap the Y-guide shaft 33 while each of the permanent magnet 42 and the coil 44 is positioned to overlap the Y-guide shaft 34 as viewed from the front of the zoom lens barrel 10. Namely, the portions (the Y-guide shafts 33 and 34) which guide the second movable stage 31 in the Y-direction and the portions (the permanent magnets 41 and 42 and the coils 43 and 44) which provide a driving force for driving the second movable stage 31 in the Y-direction are positioned so as to overlap each other as viewed from the front of the zoom lens barrel 10. This arrangement makes it possible to drive the second movable stage 31 in the Y-direction smoothly by the electromagnetic actuator 40 in the image shake correction control in the zoom range because, in a driving mechanism using a guide member such as a guide shaft, the suppression effect on the moment of inertia of a movable member (the second movable stage 31) when it is driven becomes greater as the aforementioned guide member and the portion for providing a driving force for driving the movable member are positioned closer to each other. In addition, as can be understood from FIG. 7, the permanent magnets 41 and 42 and the coils 43 and 44 sit at positions close to the X-guide shaft 32 that serves as a main guide member for guiding the first movable stage 30 in the X-direction (positions in the Y-direction between the X-guide shaft 32 and an imaginary line which extends in the X-direction and passes through the optical axis O) when the second movable stage 31 is in the anti-shake driving position. Accordingly, also when the first movable stage 30 is driven in the X-direction by the electromagnetic actuator 40 in the image shake correction control, the suppression effect on the moment of inertia of the first movable stage 30 can be obtained.

In the lens barrel retracting operation performed from a state where the zoom lens barrel 10 is set in the zoom range, the zoom lens barrel 10 operates in the reverse manner to the above described lens barrel advancing operation. Specifically, the first the third lens group frame 13 is moved to position at the rear movement limit thereof shown in FIG. 1 by an operation of the AF motor 61. Subsequently, a rotation of the zoom motor 62 in the lens barrel retracting direction causes the second lens group moving ring 25 to move rearward in the optical axis direction, and this rearward movement of the second lens group moving ring 25 causes the cam-contacting portion 51b of the insertion/removal-operation control lever 51 which moves rearward with the second lens group moving ring 25 to come in contact with the end-face cam 57a of the removing-operation control projection 57 (see FIG. 13). A further rearward movement of the second lens group moving ring 25 causes the cam-contacting portion 51b to be pressed by the end-face cam 57a. Thereupon, a component force is produced from the retracting force of the second lens group moving ring 25, so that the insertion/removal-operation control lever 51 is rotated toward the removed-lens holding position from the lens insertion position against the biasing force of the lever biasing spring 54. Thereupon, the position control pin 31h moves into the insertion/removal-operation guide groove 55 from the displacement prevention groove 56, and the removing-operation guide surface 55a presses the position control pin 31h downward so that the second movable stage 31 moves from the anti-shake driving position toward the removed position. A further rearward movement of the second lens group moving ring 25 causes the removed-lens holding surface 51c of the insertion/removal-operation control lever 51 to be positioned on the removed-lens holding surface 57b of the removing-operation control projection 57, so that the insertion/removal-operation control lever 51 is held in the removed-lens holding position and prevented from rotating toward the lens insertion position. Namely, the second movable stage 31 is held in the removed position.

The movement of the second movable stage 31 from the anti-shake driving position to the removed position that is caused by the insertion/removal-operation control lever 51 is completed before the second lens group moving ring 25 reaches the rear movement limit thereof shown in FIG. 1. Subsequently, a further rearward movement of the second lens group moving ring 25 after completion of the displacement of the second movable stage 31 causes the lens holding frame 13a of the third lens group frame 13 to enter into the opening 30e of the first movable stage 30, the open area of which has been increased (see FIGS. 9 and 10), thus moving the zoom lens barrel 10 to the aforementioned accommodated state (shown in FIG. 1).

In the above description about the lens barrel retracting operation of the zoom lens barrel 10, the retracting operation of the third lens group frame 13 is performed by driving the AF motor 61 prior to the driving of the zoom motor 62 in the lens barrel retracting direction; however, it is possible to omit the retracting operation of the third lens group frame 13 that is performed by the AF motor 61 on the condition that the movement of the second movable stage 31 to the removed position is completed before interference with the third lens group frame 13 occurs. In this case, the following structure can be adopted: the drive mechanism for the third lens group frame 13 is structured in advance so that the rearward movement of the third lens group frame 13 is not mechanically restricted, and a movable member (the second lens group moving ring 25 or another member) which retracts by a driving force of the zoom motor 61 is brought into contact with the third lens group frame 13 to make the third lens group frame 13 retract to the rear movement limit thereof shown in FIG. 1 together with the said movable member.

As described above, in the zoom lens barrel 10, a reduction in length of the imaging optical system in the accommodated state is achieved by the structure such that the second lens group LG2 and the third lens group LG3 are positioned so as to be spaced apart from each other in the optical axis direction in a ready-to-photograph state and that the second lens group LG2 and the third lens group LG3 are positioned to be substantially aligned in the Y-direction (i.e., positioned to lie in a plane orthogonal to the optical axis O) in the accommodated state. In addition, since the positions of the first movable stage 30 and the second movable stage 31 of the anti-shake unit 26 are controlled by the electromagnetic actuator 40 in a ready-to-photograph state to perform the image shake correcting operation and since the position control mechanism for the second lens group LG2 is structured so that only the second movable stage 31, which is supported by the first movable stage 30 thereon, is moved to the removed position by the insertion/removal drive mechanism 50 when the zoom lens barrel 10 is accommodated, a section of the zoom lens barrel 10 which performs the insertion/removal operation is small and light-weight, so that a space-saving effect is attained and a load reduction on the insertion/removal drive mechanism 50 is achieved.

In regard to space saving, unlike the present embodiment, the displacing operation of the second lens group LG2 can be made to be performed, e.g., by a movement of the first movable stage 30; however, in this case it is required to increase the diameter of the second lens group moving ring 25 to secure a space necessary for the first movable stage 30 to be displaced (removed); in addition, the guide mechanism for the first movable stage 30 becomes great in size. In contrast to this, according to the structure of the present embodiment which moves only the second movable stage 31 to the removed position thereof, an increase in size of the second lens group moving ring 25 can be prevented since the guide mechanism for the second movable stage 31 and the space allowing the second movable stage 31 to move are secured within the frame of the first movable stage 30. Additionally, the drive source for rotating the insertion/removal-operation control lever 51 from the lens-insertion position to the removed-lens holding position is the zoom motor 62 that makes the second lens group moving ring 25 move in the optical axis direction, and the load on the zoom motor 62 is reduced by a reduction in weight of the insertion/removal operating portion including the second lens group LG2. Since the zoom motor 62 plays a role in driving all the movable components of the zoom lens barrels 10 which are disposed in the housing 14, the above described structure according to the present invention which can reduce the load of driving such movable components is of great value.

Figure 21:
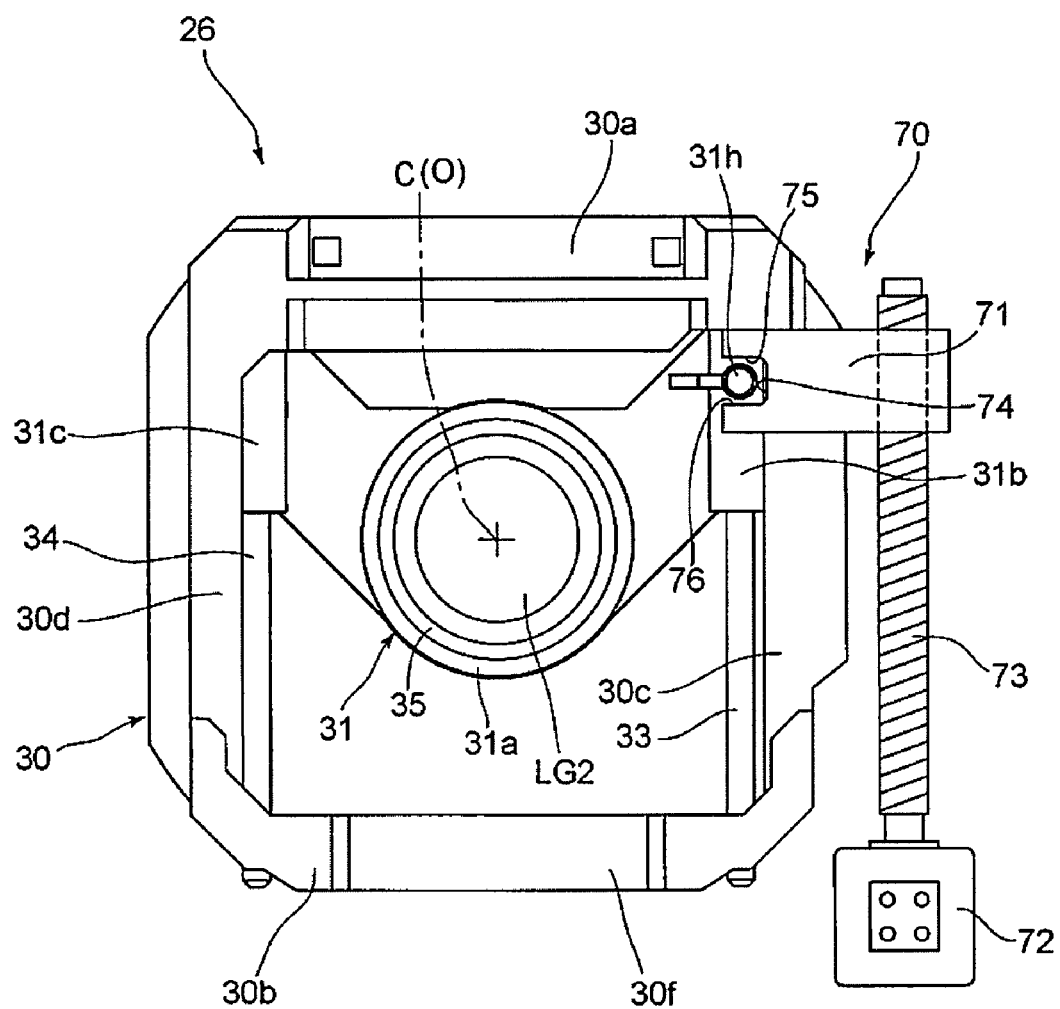
FIG. 21 is a rear elevational view of the insertion/removal drive mechanism and the anti-shake unit in a ready-to-photograph state, in which the second lens group is positioned in the anti-shake driving position, in a second embodiment of the zoom lens barrel, viewed from the rear in the optical axis direction.
Figure 22:
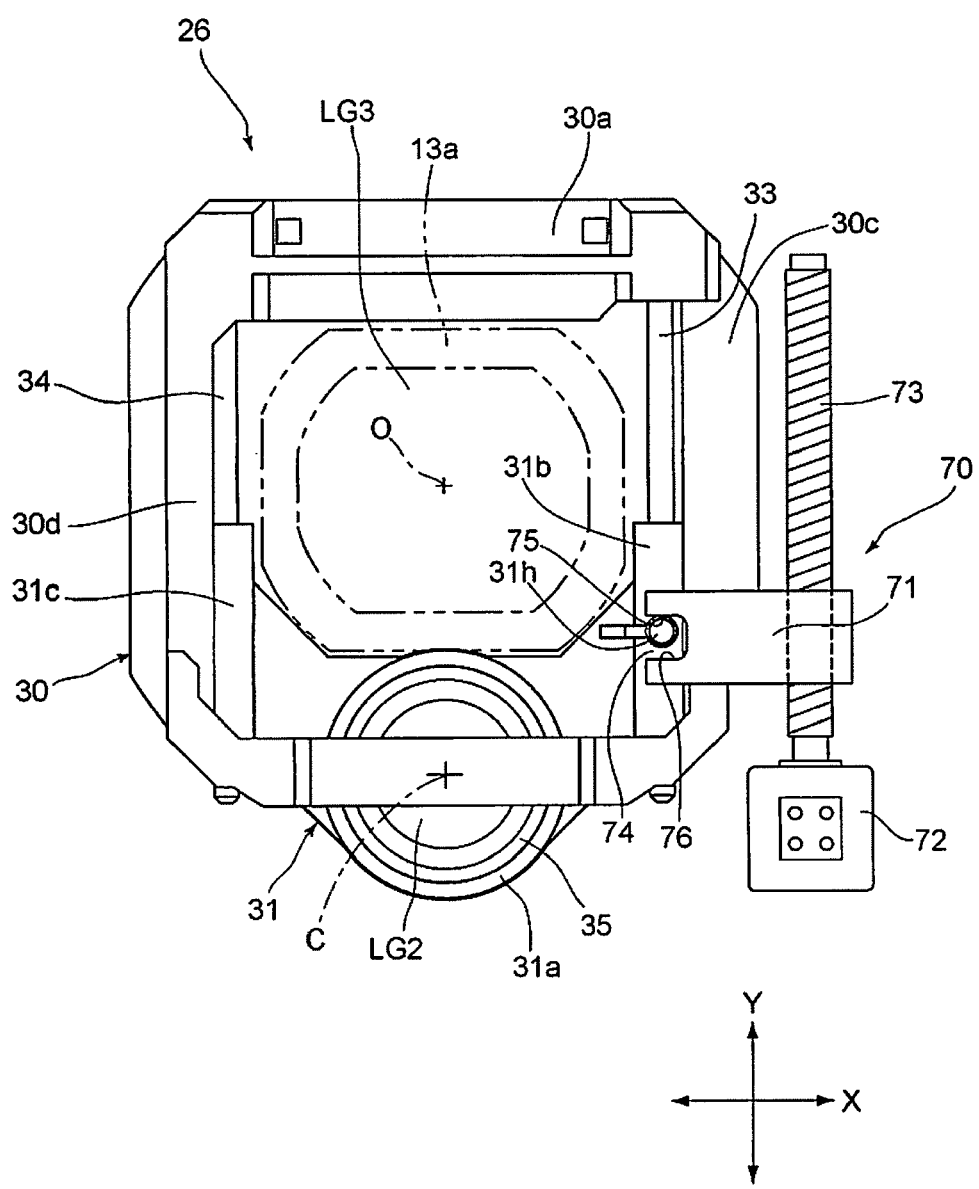
FIG. 22 is a rear elevational view of the insertion/removal drive mechanism and the anti-shake unit in the accommodated state of the zoom lens barrel, in which the second lens group is positioned in the removed position, in the second embodiment of the zoom lens barrel, viewed from the rear in the optical axis direction.

FIGS. 21 and 22 show an insertion/removal drive mechanism 70 in a second embodiment of the zoom lens barrel in which the insertion/removal operational member for controlling the position of the second movable stage 31 is configured from a linear insertion/removal member 71 which moves linearly in the Y-direction instead of a swing member such as the insertion/removal-operation control lever 51. The insertion/removal drive mechanism 70 is provided with a motor 72 as a drive source for the linear insertion/removal member 71. The motor 72 is provided with a drive shaft 73 that extends upward along the Y-direction. The drive shaft 73 is provided on an outer peripheral surface thereof with a feed screw thread, and the linear insertion/removal member 71 is provided with a screw hole in which the feed screw thread is screw-engaged. The linear insertion/removal member 71 is prevented from rotating about the axis of the drive shaft 73. Therefore, rotating the drive shaft 73 forward and reverse by the motor 72 causes the linear insertion/removal member 71 to move up and down in the Y-direction. FIG. 21 shows the lens insertion position of the linear insertion/removal member 71 that corresponds to the anti-shake driving position of the second lens group LG2 (the second movable stage 31) and FIG. 22 shows the removed-lens holding position of the linear insertion/removal member 71 that corresponds to the removed position of the second lens group LG2 (the second movable stage 31).

The linear insertion/removal member 71 is provided with a U-shaped recess 74 which is open at one end thereof in the X-direction, and is further provided in the recess 74 with a removing-operation guide surface 75 and an inserting-operation guide surface 76 which are spaced from each other in the Y-direction. Each of the removing-operation guide surface 75 and the inserting-operation guide surface 76 extends in the X-direction, and the position control pin 31h is inserted in between the removing-operation guide surface 75 and the inserting-operation guide surface 76. Both the distance between the removing-operation guide surface 75 and the inserting-operation guide surface 76 in the Y-direction and the depth of the recess 74 in the X-direction are each greater than the diameter of the position control pin 31h by a predetermined degree, so that the position control pin 31h is loosely engaged in the recess 74. More specifically, the distance between the removing-operation guide surface 75 and the inserting-operation guide surface 76 in the Y-direction and the depth of the recess 74 in the X-direction are determined so as not to interfere with movements of the second movable stage 31 (and the first movable stage 30) for image shake correction which are caused by the electromagnetic actuator 40 (not shown in FIGS. 21 and 22 though equipped with elements similar to those of the electromagnetic actuator 40 in the previous (first) embodiment). Accordingly, when the linear insertion/removal member 71 is in the lens-insertion position shown in FIG. 21, the image shake correcting operation can be performed by controlling the positions of the first movable stage 30 and the second movable stage 31 of the anti-shake unit 26 by the electromagnetic actuator 40 without the linear insertion/removal member 71 interfering with the operations of the first movable stage 30 and the second movable stage 31. Additionally, the second movable stage 31 is prevented from moving in the Y-direction beyond the anti-shake driving range, which is determined by the electromagnetic actuator 40, by the contact of the position control pin 31h with the removing-operation guide surface 75 and the inserting-operation guide surface 76. Namely, when the linear insertion/removal member 71 is in the lens-insertion position, each of the removing-operation guide surface 75 and the inserting-operation guide surface 76 serves as a displacement prevention portion which prevents the second movable stage 31 from excessively moving in the Y-direction. Similar to the previous embodiment of the insertion/removal drive mechanism 50 using the insertion/removal-operation control lever 51, the upward movement of the second movable stage 31 can also be prevented by the contacting of the upper side portion 30a of the first movable stage 30 with the support arms 31b and 31c of the second movable stage 31 instead of the contacting of the position control pin 31h with the removing-operation guide surface 75.

Moving the linear insertion/removal member 71 from the lens insertion position shown in FIG. 21 toward the removed-lens holding position shown in FIG. 22 by an operation of the motor 72 causes the removing-operation guide surface 75 to press the position control pin 31h downward, so that the second movable stage 31 moves out of the anti-shake driving range thereof, in which the position of the second movable stage 31 is controlled by the electromagnetic actuator 40, and is held in the removed position. Conversely, moving the linear insertion/removal member 71 from the removed-lens holding position shown in FIG. 22 toward the lens insertion position shown in FIG. 21 by an operation of the motor 72 causes inserting-operation guide surface 76 to press the position control pin 31h upward, so that the second movable stage 31 returns to the anti-shake driving position, in which the position of the second movable stage 31 is controlled by the electromagnetic actuator 40.

Figure 23:
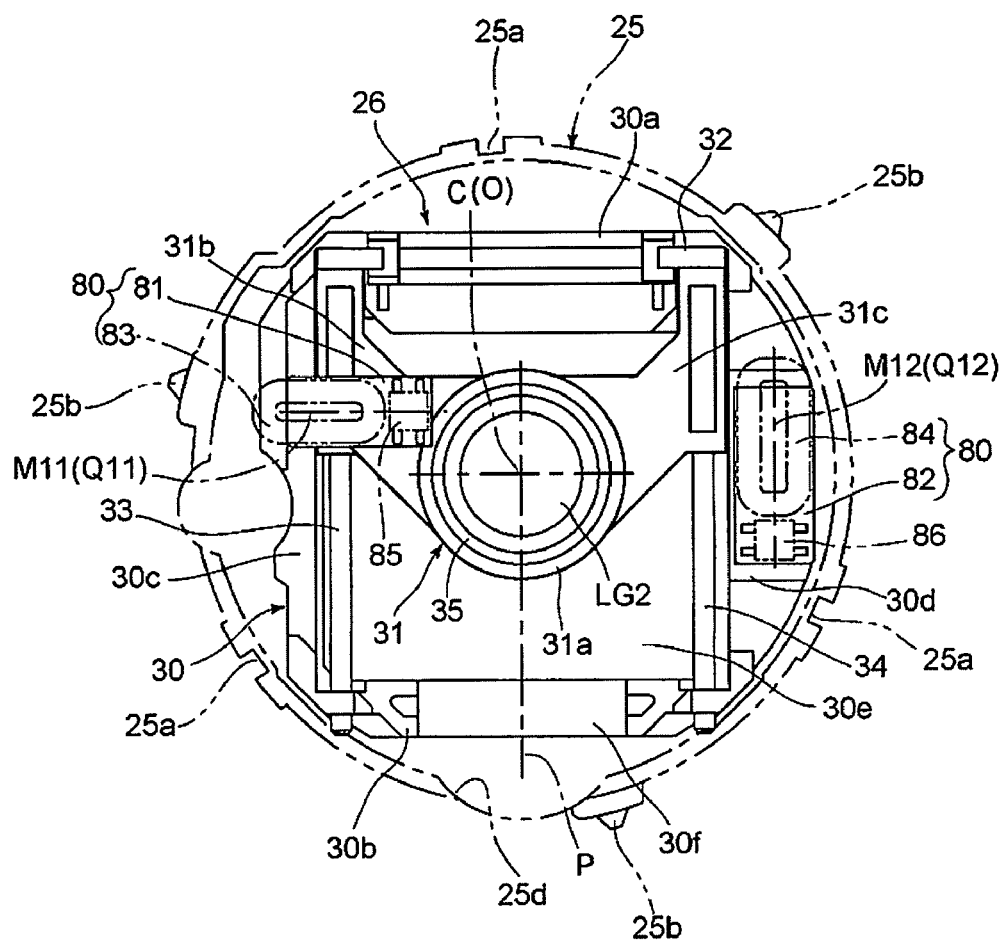
FIG. 23 is a front elevational view of the anti-shake unit in a ready-to-photograph state, in which the second lens group is positioned in the anti-shake driving position, in a third embodiment of the zoom lens barrel, viewed from the front in the optical axis direction.
Figure 23:
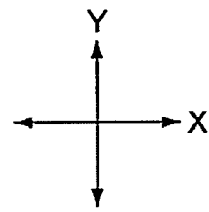
Figure 24:
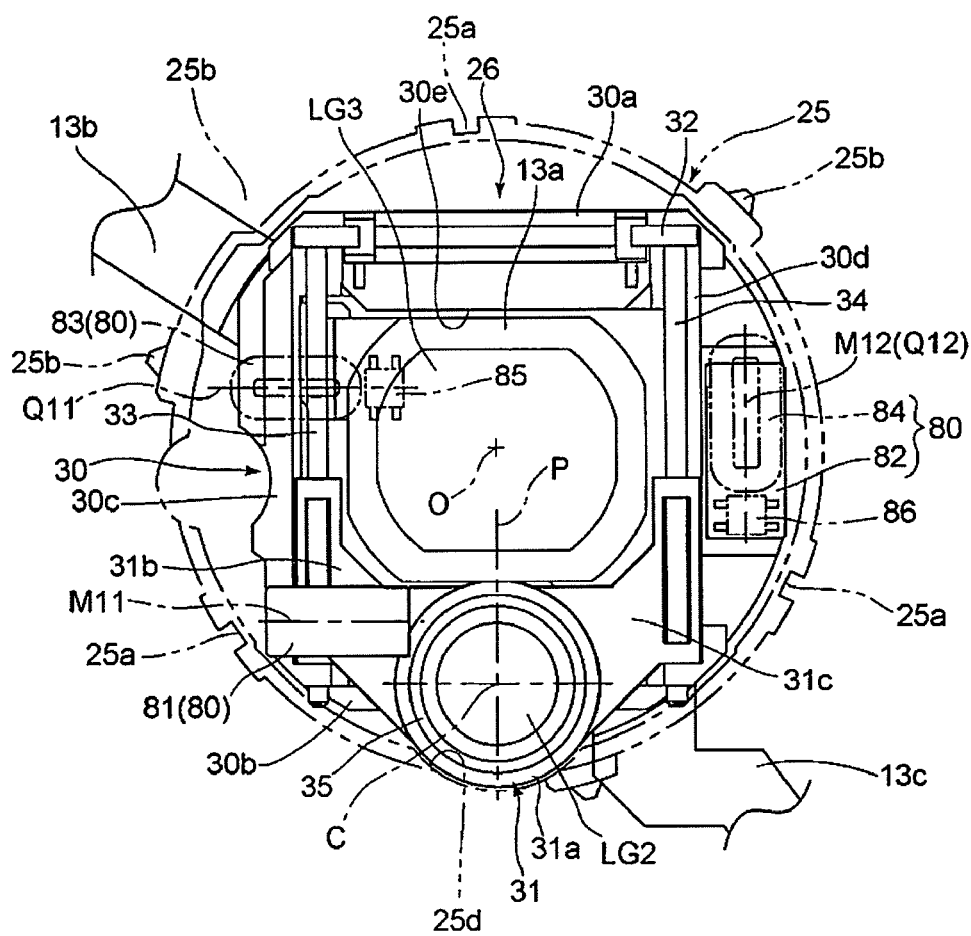
FIG. 24 is a front elevational view of the anti-shake unit in the accommodated state of the zoom lens barrel, in which the second lens group is positioned in the removed position, in the third embodiment of the zoom lens barrel, viewed from the front in the optical axis direction.

FIGS. 23 and 24 show an electromagnetic actuator 80 in a third embodiment of the zoom lens barrel, which is different in configuration from the electromagnetic actuator 40 of the previous (first and second) embodiments. The electromagnetic actuator 80 is provided with two permanent magnets 81 and 82 which are fixedly mounted on the second movable stage 31 and the first movable stage 30, respectively, and is further provided with two coils 83 and 84 which are fixed to a rear surface of the shutter unit 27 (not shown in FIGS. 23 and 24, though the same as that of the previous embodiments). Each of the permanent magnets 81 and 82 is shaped into a narrow and thin rectangular plate. Opposite sides of a magnetic pole boundary line M11 of the permanent magnet 81 which extends in the lengthwise direction thereof and passes through an approximate widthwise center of the permanent magnet 81 are magnetized into north and south poles, respectively, while opposite sides of a magnetic pole boundary line M12 of the permanent magnet 82 which extends in the lengthwise direction thereof and passes through an approximate widthwise center of the permanent magnet 82 are magnetized into north and south poles, respectively. The permanent magnet 81 is mounted on the support arm 31b of the second movable stage 31 so that the magnetic pole boundary line M11 extends in the X-direction. The permanent magnet 82 is mounted on the lateral side portion 30d so that the magnetic pole boundary line M12 extends in the Y-direction. Each of the coils 83 and 84 is an air-core coil which includes a pair of elongated portions substantially parallel to each other and a pair of curved (U-shaped) portions which connect the pair of elongated portions. The coil 83 is positioned so that a long-axis directional line Q11 thereof becomes substantially parallel to the magnetic pole boundary line M11 of the permanent magnet 81 and the coil 84 is positioned so that a long-axis directional line Q12 thereof becomes substantially parallel to the magnetic pole boundary line M12 of the permanent magnet 82. A position sensor 85 is installed on a rear surface of the shutter unit 27 in the close vicinity of the coil 83 and a position sensor 86 is installed on a rear surface of the shutter unit 27 in the close vicinity of the coil 84. The positions of the second lens group LG2, which moves with the permanent magnets 81 and 82, in the X-direction and the Y-direction can be detected by the position sensors 85 and 86.

In the electromagnetic actuator 80, upon the coil 83 being energized in a state (shown in FIG. 23) where the coil 83 is positioned in the magnetic field of the permanent magnet 81 with the permanent magnet 81 and the coil 83 facing each other in the optical axis direction, a driving force is generated in the Y-direction that is substantially orthogonal to the magnetic pole boundary line M11 and the long-axis direction line Q11 in a plane orthogonal to the optical axis O. In addition, upon the coil 84 being energized in a state (shown in FIGS. 23 and 24) where the coil 84 is positioned in the magnetic field of the permanent magnet 82 with the permanent magnet 82 and the coil 84 facing each other in the optical axis direction, a driving force is generated in the X-direction that is substantially orthogonal to the magnetic pole boundary line M12 and the long-axis direction line Q12 in a plane orthogonal to the optical axis O. Accordingly, the second movable stage 31 can be moved in the Y-direction by controlling the passage of current through the coil 83 and the first movable stage 30 can be moved in the X-direction by controlling the passage of current through the coil 84.

The second movable stage 31 can be moved between the anti-shake driving position shown in FIG. 23 and the removed position shown in FIG. 24 by an insertion/removal drive mechanism corresponding to the first embodiment of the insertion/removal drive mechanism 50 or the second embodiment of the insertion/removal drive mechanism 70. This (third) embodiment of the zoom lens barrel differs from those of the first and second embodiments in that, when the second lens group LG2 is in the removed position, the permanent magnet 81 and the coil 83 of the electromagnetic actuator 80 are spaced apart from each other in the Y-direction, thus becoming incapable of controlling the position of the second movable stage 31, while the permanent magnet 82 and the coil 84 remain positioned relative to each other so as to be capable of controlling the position of the second movable stage 31. As shown in FIG. 24, since the movement of the second movable stage 31 to the removed position causes the permanent magnet 81 that is supported by the support arm 31b thereon to be positioned below the opening 30e of the first movable stage 30, the permanent magnet 81 does not interfere with the lens holding frame 13a of the third lens group frame 13. In addition, since the permanent magnet 82 is supported by the first movable stage 30 thereon to be positioned outside the opening 30e at all times, the permanent magnet 82 does not interfere with the lens holding frame 13a of the third lens group frame 13.

Although the present invention has been discussed with reference to the above described embodiments, the present invention is not limited to these particular embodiments. For instance, although the first movable stage 30 and the second movable stage 31 linearly move in the X-direction and the Y-direction in the above described embodiments, respectively, the present invention can also be applied to non-linearly movable members. Namely, the present invention can be applied to the case where the first movable stage 30 is modified into a swing member which swings (rotates) in a direction having a directional component in the X-direction or to the case where the second movable stage 31 is modified into a swing member which swings (rotates) in a direction having a directional component in the Y-direction. In addition, although the moving directions of the first movable stage 30 and the second movable stage 31 are orthogonal to each other in the above illustrated embodiments, the moving directions of the first movable stage 30 and the second movable stage 31 can cross each other at any angles other than right angles. Namely, in the present invention, the relationship between the first movable member and the second movable member that hold (support) an optical element for image shake correction can be such that the first movable member and the second movable member move in directions intersecting each other in a plane orthogonal to the optical axis of the optical element.

Additionally, although the two permanent magnets (41 and 42, or 81 and 82) are installed on the side where the first movable stage 30 and the second movable stage 31 that serve as movable members are installed while the two coils (43 and 44, or 83 and 84) are fixedly supported by the second lens group moving ring 25 (i.e., the shutter unit 27) therein in the electromagnetic actuators 40 and 80 in the above illustrated embodiments, this positional relationship is reversible. However, since electrical wires for energization of the coils needs to be connected to the coils, such an arrangement as that in the above described embodiments in which the coils are installed to a member on the stationary side and the magnets are installed to the movable member side is advantageous with respect to the wiring of the electrical wires.

Although the optical element for use in image shake correction is a lens group in the above illustrated embodiment of the zoom lens barrel 10, the present invention can also be applied to a position controller for an optical element other than a lens group such as an image sensor (image pickup device).

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A position controller for an optical element that is provided in an optical system, comprising:
   a first movable member supported by a support member to be movable relative to said support member in a first direction that is orthogonal to an optical axis of said optical system;

a second movable member which holds said optical element and is supported by said first movable member to be movable relative to said first movable member in a second direction that is orthogonal to said optical axis and that is nonparallel to said first direction;

an electromagnetic actuator including at least one magnet and at least one coil which are mounted to one and the other of said support member and said second movable member to produce a driving force for moving at least said second movable member in said second direction by passage of current through said coil within a magnetic field created by said magnet; and an insertion/removal driver that is directly connected to said second movable member and directly moves said second movable member in said second direction between an anti-shake driving position, at which a position control for said second movable member can be performed using said electromagnetic actuator, and a removed position at which said second movable member is positioned outside a range of said position control that uses said electromagnetic actuator.

2. The position controller according to claim 1, wherein said magnet and said coil, which are mounted to one and the other of said support member and said second movable member, apply a driving force on said second movable member when said coil is energized, said driving force including both a directional component in said first direction and a directional component in said second direction.

3. The position controller according to claim 1, wherein said magnet and said coil, which are mounted to one and the other of said support member and said second movable member, apply a driving force on said second movable member in said second direction when said coil is energized, and wherein said electromagnetic actuator further comprises at least one second magnet and at least one second coil which are mounted to one and the other of said support member and said first movable member to apply a driving force on said first movable member in said first direction when said second coil is energized.

4. The position controller according to claim 1, wherein said first direction and said second direction are straight directions substantially orthogonal to each other, wherein said support member comprises a first linear guide shaft extending in said first direction, said first movable member being supported by said first linear guide shaft to be movable in an axial direction thereof, and wherein said first movable member comprises at least one second linear guide shaft extending in said second direction, said second movable member being supported by said second linear guide shaft to be movable in an axial direction thereof.

5. The position controller according to claim 4, wherein said support member comprises an elongated hole that is elongated in said first direction, wherein said second guide shaft is slidably inserted in said elongated hole so as to be guided in said first direction.

6. The position controller according to claim 4, wherein said first movable member is in the shape of a substantially rectangular frame comprising:

a pair of first-direction elongated portions extending in said first direction;

a pair of second-direction elongated portions extending in said second direction; and an opening defined by said pair of first-direction elongated portions and said pair of second-direction elongated portions, wherein at least one of said pair of first-direction elongated portions includes a guide hole into which said first linear guide shaft is slidably inserted, wherein a pair of said second linear guide shafts extend alongside said pair of second direction elongated portions, respectively, wherein said second movable member includes a pair of guide holes, into which said pair of second linear guide shafts are slidably inserted, respectively, and wherein said second movable member includes an optical element holding portion which is positioned between said pair of guide holes of said second movable member in said first direction, said optical element holding portion holding said optical element.

7. The position controller according to claim 6, wherein one of said pair of first direction elongated portions of said first movable member includes an offset recess that is recessed in said optical axis direction, wherein said optical element holding portion of said second movable member is positioned in said opening of said first movable member when said second movable member is positioned in said anti-shake driving position, and wherein said optical element holding portion of said second movable member enters said offset recess when said second movable member moves from said anti-shake driving position to said removed position.

8. The position controller according to claim 6, further comprising a second optical element that is movable in said optical axis direction relative to said support member, wherein said second optical element is positioned away from said optical element in said optical axis direction when said second movable member is positioned at said anti-shake driving position, and wherein said second optical element enters into said opening when said second movable member moves from said anti-shake driving position to said removed position.

9. The position controller according to claim 1, wherein said support member is cylindrical in shape and surrounds said first movable member, and wherein said support member includes a positioning recess which is formed on an inner peripheral surface of said support member to allow said second movable member to partly enter the positioning recess for positioning said first movable member and said second movable member in said first direction when said second movable member is positioned in said removed position.

10. The position controller according to claim 1, wherein said support member is movable in said optical axis direction, wherein said insertion/removal driver comprises:

an insertion/removal operational member which is supported by said support member and movable between an insertion position to position said second movable member at said anti-shake driving position and a removed holding position to position said second movable member at said removed position;

a biaser which biases said insertion/removal operational member toward said insertion position; and a removing-operation guide member which comes into contact with said insertion/removal operational member at a predetermined position of said support member in said optical axis direction and moves said insertion/removal operational member to said removed holding position against a biasing force of said biaser in accordance with a movement of said support member in said optical axis direction.

11. The position controller according to claim 10, wherein said insertion/removal operational member comprises a swing member which is supported by said support member to be swingable about an axis of rotation that is substantially parallel to said optical axis.

12. The position controller according to claim 1, wherein said position controller is incorporated in a photographing lens that is provided with a shake reduction system.

13. The position controller according to claim 12, wherein said photographing lens is of a lens shutter type, wherein a shutter unit is fixed to said support member.

14. A position controller for an optical element that is provided in an optical system, comprising:

a first movable member supported by a support member to be movable relative to said support member in a first direction that is orthogonal to an optical axis of said optical system;

a second movable member which holds said optical element and is supported by said first movable member to be movable relative to said first movable member in a second direction that is orthogonal to said optical axis and that is nonparallel to said first direction;

an electromagnetic actuator including at least one magnet and at least one coil to produce a driving force for moving at least said second movable member in said second direction by passage of current through said coil within a magnetic field created by said magnet; and an insertion/removal driver that moves said second movable member in said second direction between an anti-shake driving position, at which a position control for said second movable member can be performed using said electromagnetic actuator, and a removed position at which said second movable member is positioned outside a range of said position control that uses said electromagnetic actuator;

wherein said support member is movable in said optical axis direction, wherein said insertion/removal driver comprises:

an insertion/removal operational member which is supported by said support member and movable between an insertion position to position said second movable member at said anti-shake driving position and a removed holding position to position said second movable member at said removed position;

a biaser which biases said insertion/removal operational member toward said insertion position; and a removing-operation guide member which comes into contact with said insertion/removal operational member at a predetermined position of said support member in said optical axis direction and moves said insertion/removal operational member to said removed holding position against a biasing force of said biaser in accordance with a movement of said support member in said optical axis direction.

* * * * *